US012683437B2

(12) United States Patent
Takeda

(10) Patent No.: US 12,683,437 B2
(45) Date of Patent: Jul. 14, 2026

(54) STATOR AND MOTOR

(71) Applicant: NIDEC CORPORATION, Kyoto (JP)

(72) Inventor: Kosuke Takeda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 367 days.

(21) Appl. No.: 18/246,678

(22) PCT Filed: Sep. 21, 2021

(86) PCT No.: PCT/JP2021/034609
§ 371 (c)(1),
(2) Date: Mar. 27, 2023

(87) PCT Pub. No.: WO2022/071029
PCT Pub. Date: Apr. 7, 2022

(65) Prior Publication Data
US 2023/0369921 A1      Nov. 16, 2023

(30) Foreign Application Priority Data
Sep. 30, 2020      (JP) ................................. 2020-165709

(51) Int. Cl.
*H02K 1/16*      (2006.01)
*H02K 3/28*      (2006.01)
*H02K 3/50*      (2006.01)
(52) U.S. Cl.
CPC ................. *H02K 1/16* (2013.01); *H02K 3/28* (2013.01); *H02K 3/50* (2013.01); *H02K 2203/09* (2013.01)
(58) Field of Classification Search
CPC .. H02K 3/28; H02K 3/12; H02K 1/16; H02K 3/50; H02K 3/505; H02K 2203/09
(Continued)

(56) References Cited

U.S. PATENT DOCUMENTS 8,193,675 B2      6/2012   Ishizuka et al.
9,455,605 B2      9/2016   Saito et al.
(Continued)

FOREIGN PATENT DOCUMENTS

JP      201490615 A      5/2014
JP      201728847 A      2/2017
(Continued)

OTHER PUBLICATIONS

Park Machine Translation (Year: 2017).*
(Continued)

*Primary Examiner* — Christopher M Koehler
(74) *Attorney, Agent, or Firm* — HAUPTMAN HAM, LLP

(57)      ABSTRACT

A stator includes star-connected coils of a plurality of phases. Each coil has bodies each configured by connecting conductors in series. Each body is wound while passing alternately through an M-th layer and an (M+1)-th layer of a slot. Each body includes: a first terminal; a first part wave-wound from the first terminal to one side in a circumferential direction; a folded portion connected to the first part on the one side; a second part wave-wound from the folded portion to the other side in the circumferential direction; and a second terminal connected to the second part on the other side. The first parts of the bodies of the same phase are sequentially arranged in slots arranged one by one on the one side. The second parts of the bodies of the same phase are sequentially arranged in slots arranged one by one on the other side.

20 Claims, 18 Drawing Sheets

(58) Field of Classification Search
USPC ........................................................ 310/207
See application file for complete search history.

(56)                              References Cited

U.S. PATENT DOCUMENTS

| | | | |
|---|---|---|---|
| 10,250,096 B2 | 4/2019 | Nishikawa et al. | |
| 10,505,424 B2 | 12/2019 | Tamura et al. | |
| 2005/0194857 A1* | 9/2005 | Mori ........................ | H02K 3/12 |
| | | | 310/201 |
| 2012/0007462 A1* | 1/2012 | Kouda ..................... | H02K 3/12 |
| | | | 310/206 |
| 2015/0076953 A1* | 3/2015 | Tamura .................... | H02K 3/28 |
| | | | 310/208 |
| 2015/0097453 A1* | 4/2015 | Nishikawa ............... | H02K 3/50 |
| | | | 310/71 |
| 2019/0149004 A1* | 5/2019 | Tamura .................... | H02K 1/16 |
| | | | 310/71 |
| 2019/0222078 A1* | 7/2019 | Liang ................... | H02K 15/064 |
| 2019/0386533 A1* | 12/2019 | Lee ........................... | H02K 3/28 |
| 2020/0067362 A1* | 2/2020 | Shiah ....................... | H02K 3/28 |

FOREIGN PATENT DOCUMENTS

| | | | |
|---|---|---|---|
| KR | 101803879 B1 | * | 12/2017 |
| KR | 20180117476 A | * | 10/2018 |

OTHER PUBLICATIONS

Lee Machine Translation (Year: 2018).*
International Search Report in PCT/JP2021/034609, mailed Dec. 14, 2021. 4pp.

* cited by examiner

STATOR AND MOTOR

CROSS-REFERENCE TO RELATED APPLICATIONS

This is the U.S. national stage of application No. PCT/JP2021/034609, filed on Sep. 21, 2021, and priority under 35 U.S.C. § 119(a) and 35 U.S.C. § 365(b) is claimed from Japanese Patent Application No. 2020-165709, filed on Sep. 30, 2020.

FIELD OF THE INVENTION

The present invention relates to a stator and a motor.

The present application claims priority based on Japanese Patent Application No. 2020-165709 filed in Japan on Sep. 30, 2020, the contents of which are incorporated herein by reference.

BACKGROUND

In recent years, a stator in which a rectangular electric wire is arranged in a slot to improve a space factor of the electric wire in the slot is known.

In the motor described above, ends of the electric wire are respectively arranged on a radially inner edge and the radially outer edge of the stator. A neutral-point bus bar forming a neutral point and a phase bus bar configured to cause a current of the electric wire to flow are connected to the ends of the conducting wire. In this manner, the stator of the related art has a problem that workability in a connection process with the bus bar is poor.

SUMMARY

One aspect of an exemplary stator of the present invention includes: a stator core that has an annular shape centered on a central axis and is provided with a plurality of slots arranged in a circumferential direction; and phase coil portions of a plurality of phases mounted on the stator core. The phase coil portion includes a conductor connection body configured by connecting a plurality of conductors in series. The conductor connection body includes: a plurality of straight portions passing through the slots; a plurality of curved portions extending across the straight portions on one side in an axial direction of the stator core; and a plurality of connection portions connecting the conductors on the other side in the axial direction of the stator core. The slot is provided with even-numbered layers arranged in a radial direction. The conductor connection body is wound by causing the straight portions arranged in the circumferential direction to alternately pass through the layer as an M-th layer and the layer as an (M+1)-th layer with M being an odd natural number. The conductor connection body includes: a first terminal portion; a first part wave-wound from the first terminal to the one side in the circumferential direction; a folded portion connected to an end of the first part on the one side in the circumferential direction; a second part wave-wound from the folded portion to the other side in the circumferential direction; and a second terminal portion connected to an end of the second part on the other side in the circumferential direction. The first parts of a plurality of the conductor connection bodies of the same phase are sequentially arranged in slots arranged one by one on the one side in the circumferential direction. The second parts of a plurality of the conductor connection bodies of the same phase are sequentially arranged in slots arranged one by one on the other side in the circumferential direction. The first terminal portion and the second terminal portion extend from the layer as an outermost layer. The phase coil portion includes at least two or more of the conductor connection bodies. The first terminal portions of the two or more conductor connection bodies of the phase coil portion are electrically connected to each other. The second terminal portions of the two or more conductor connection bodies of the phase coil portion are electrically connected to each other.

One aspect of an exemplary motor of the present invention includes the above-described stator and a rotor radially opposing the stator.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is a vertical direction in which a positive side is an "upper side" and a negative side is a "lower side". A central axis J appropriately illustrated in each drawing is a virtual line that is parallel to the Z-axis direction and extends in the vertical direction. In the following description, in some cases, an axial direction of the central axis J, that is, the direction parallel to the vertical direction is simply referred to as an "axial direction", the upper side is referred to as "one side in the axial direction", and the lower side is referred to as the "other side in the axial direction". Further, a radial direction centered on the central axis J is simply referred to as a "radial direction" in some cases. Furthermore, in some cases, a circumferential direction centered on the central axis J is simply referred to as a "circumferential direction", a clockwise direction when viewed from above is referred to as "one side in the circumferential direction", and a counterclockwise direction when viewed from above is referred to as the "other side in the circumferential direction".

Note that the vertical direction, the upper side, and the lower side are names for simply describing an arrangement relationship of each part and the like, and an actual arrangement relationship and the like may be also an arrangement relationship and the like other than the arrangement relationship and the like indicated by these names. Furthermore, the directions described as the one side in the axial direction and the other side in the axial direction can reproduce an effect of an embodiment even when being replaced with each other. Similarly, directions described as one side θ1 in the circumferential direction and the other side θ2 in the circumferential direction can reproduce the effect of the embodiment even when being replaced with each other.

Figure 1:
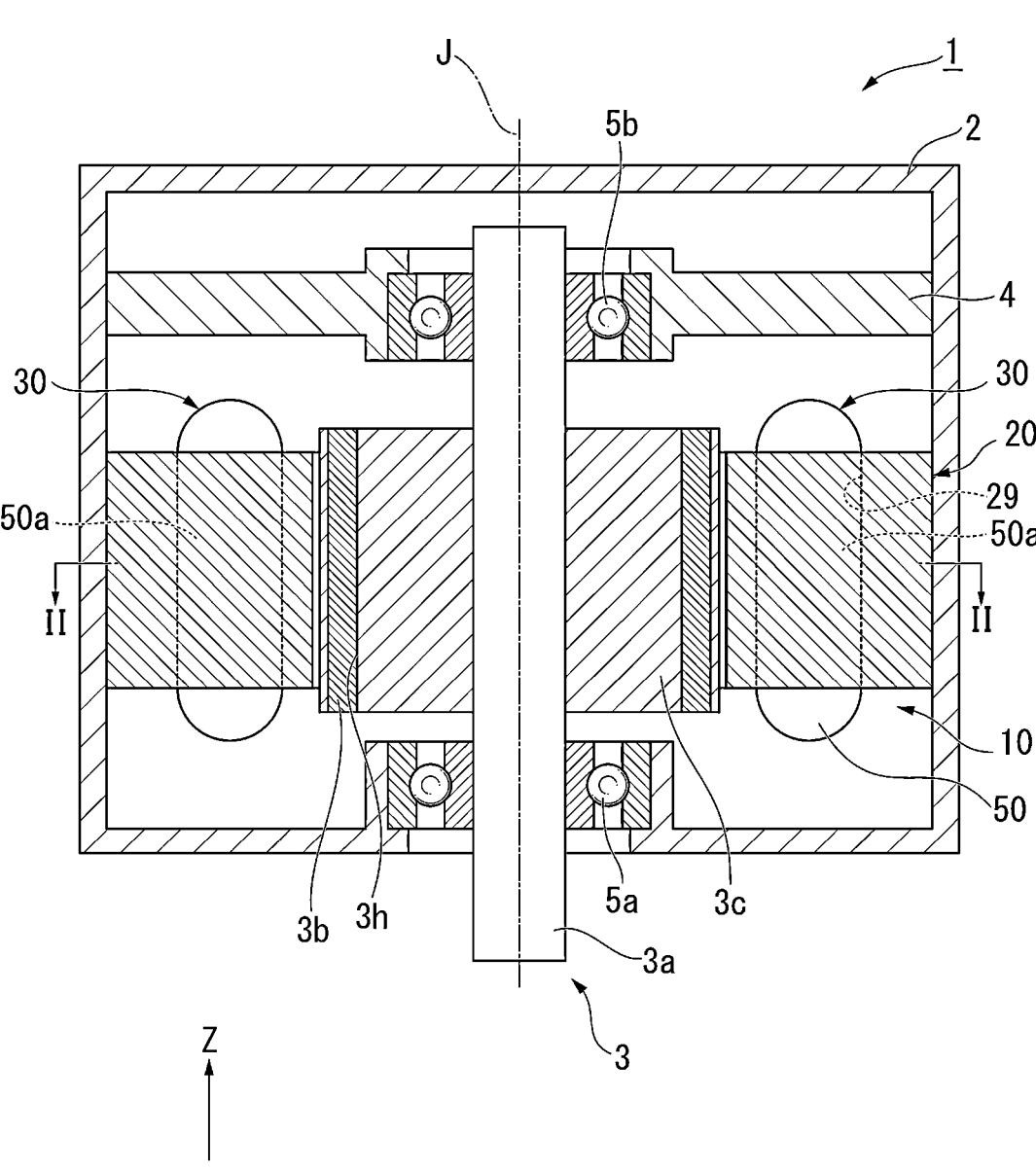
FIG. 1 is a schematic sectional view illustrating a motor according to an preferred embodiment.

FIG. 1 is a schematic sectional view illustrating a motor 1 according to the present preferred embodiment.

The motor 1 of the present preferred embodiment is an inner-rotor motor. The center of the motor 1 is the central axis J.

The motor 1 includes a housing 2, a rotor 3, a stator 10, a bearing holder 4, and bearings 5a and 5b. The housing 2 accommodates therein the rotor 3, the stator 10, the bearing holder 4, and the bearings 5a and 5b.

The rotor 3 is rotatable about the central axis J. The rotor 3 is arranged on the radially inner side of the stator 10 having an annular shape. That is, the rotor 3 opposes the stator 10 in the radial direction. The rotor 3 includes a shaft 3a, a rotor magnet 3b, and a rotor core 3c.

The shaft 3a extends in the axial direction along the central axis J. The shaft 3a has a columnar shape that is centered on the central axis J and extends in the axial direction. The shaft 3a is supported by the bearings 5a and 5b to be rotatable about the central axis J.

Figure 2:
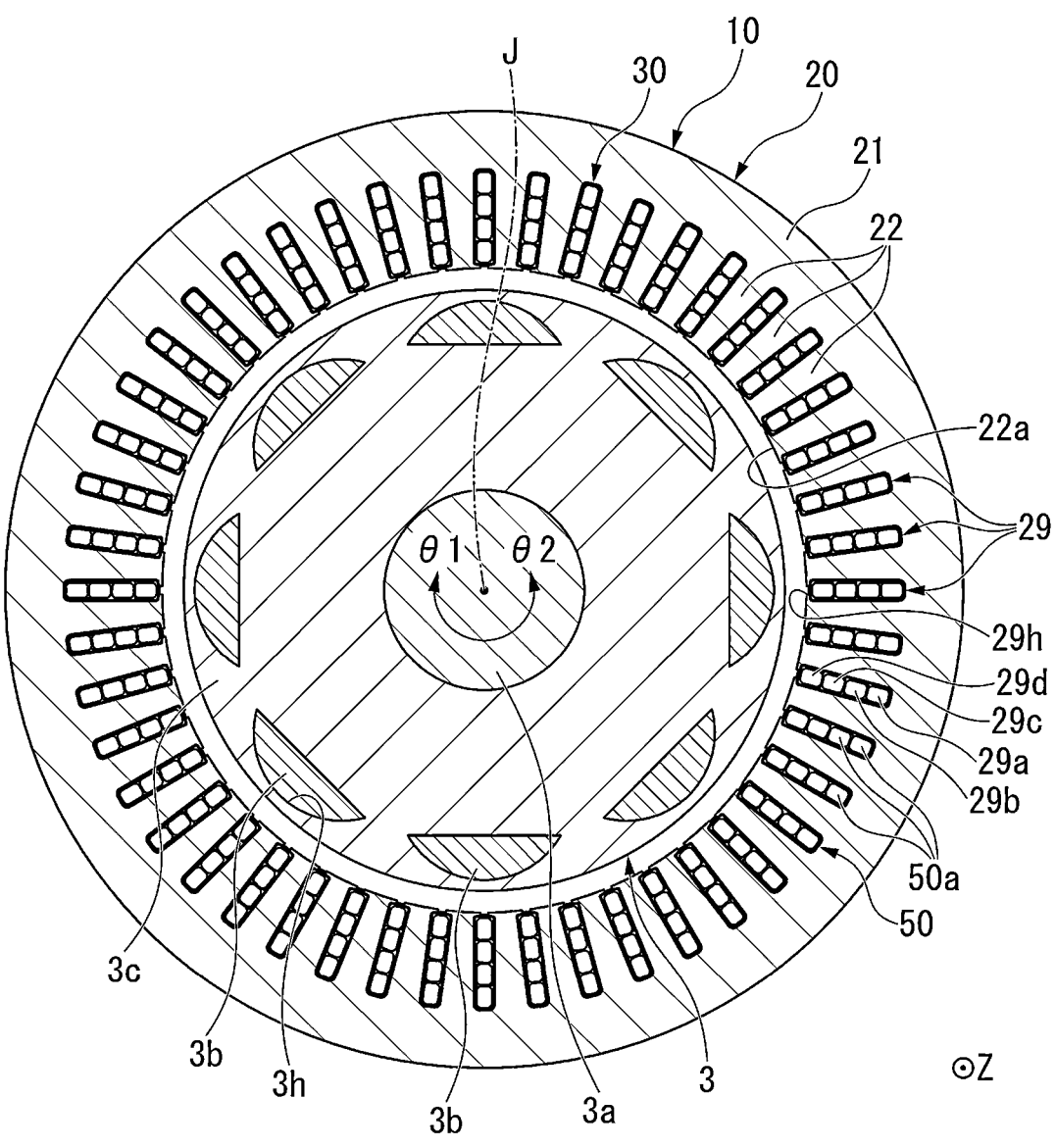
FIG. 2 is a cross-sectional view of a rotor and a stator according to the preferred embodiment.
Figure 3:
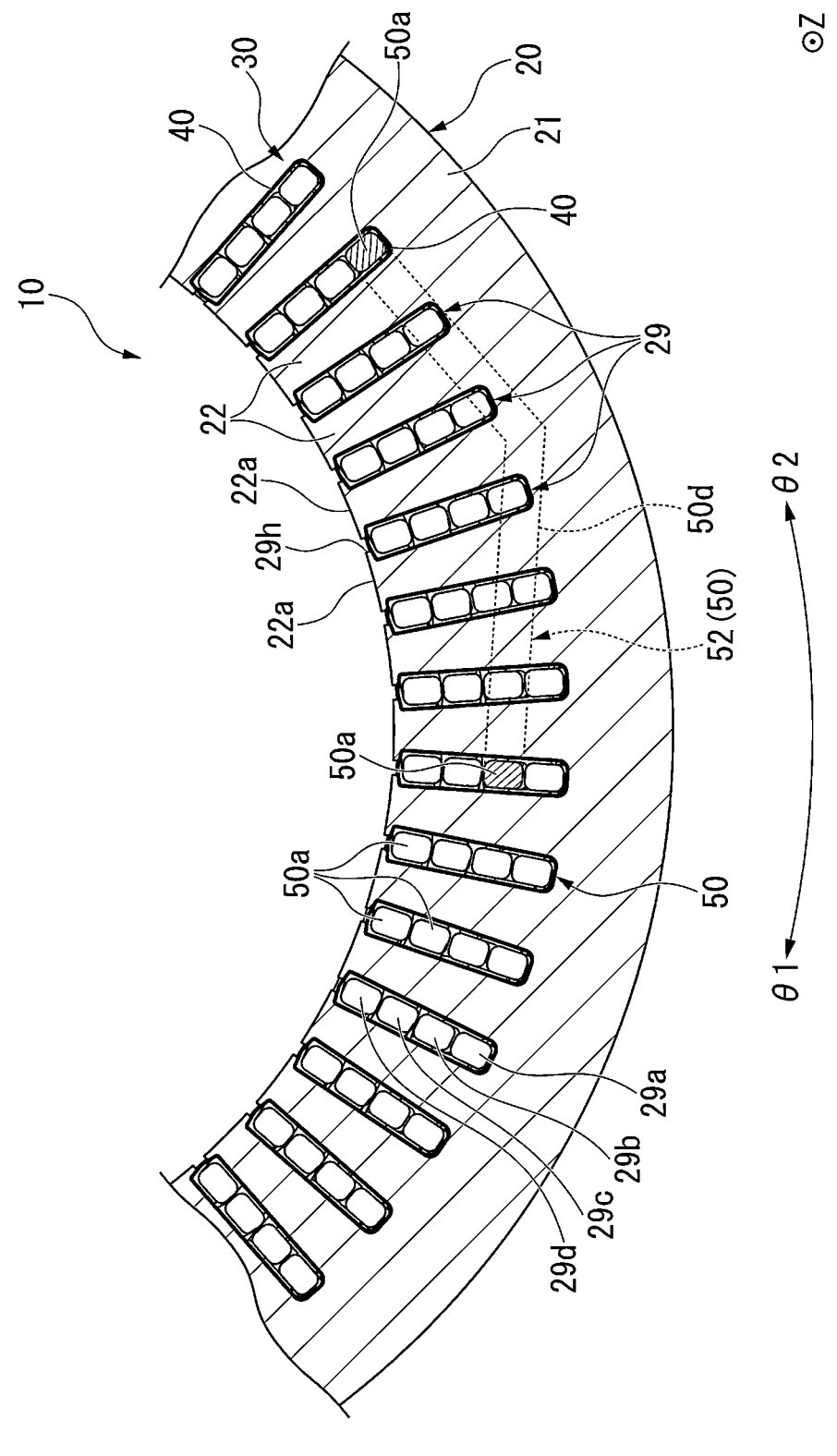
FIG. 3 is a partial cross-sectional view of the stator according to the preferred embodiment.

FIG. 2 is a cross-sectional view of the rotor 3 and the stator 10 taken along a line II-II of FIG. 1. FIG. 3 is a partial cross-sectional view of the stator 10, and is a view illustrating a part of FIG. 2.

The rotor core 3c is formed by laminating magnetic steel plates. The rotor core 3c has a tubular shape extending in the axial direction. An inner peripheral surface of the rotor core 3c is fixed to an outer peripheral surface of the shaft 3a. The rotor core 3c is located between the pair of bearings 5a and

5b in the axial direction. The rotor core 3c has a holding hole 3h into which the rotor magnet 3b is inserted and fixed.

The rotor magnet 3b opposes the stator 10 in the radial direction. The rotor magnet 3b is held in a state of being embedded in the rotor core 3c. The rotor 3 of the present preferred embodiment is provided with eight rotor magnets 3b as segment magnets. That is, the rotor magnets 3b of the present preferred embodiment have eight poles. The number of poles of the rotor 3 is not limited to that in the present preferred embodiment. Further, the rotor magnet 3b may be an annular ring magnet.

The stator 10 opposes the rotor 3 in the radial direction with a gap interposed therebetween. In the present preferred embodiment, the stator 10 is located on the radially outer side of the rotor 3. The stator 10 includes a stator core 20, a stator coil 30, and a plurality of insulating sheets 40.

The stator core 20 has an annular shape centered on the central axis J. The stator core 20 includes electromagnetic steel plates laminated along the axial direction. The stator core 20 includes a core back 21 having a cylindrical or substantially cylindrical shape centered on the central axis J and a plurality of teeth 22 extending radially inward from the core back 21.

The plurality of teeth 22 are arranged at regular intervals in the circumferential direction. Umbrellas 22a are provided at radially inward tip portions of the teeth 22. The umbrellas 22a protrude to both the sides in the circumferential direction from the teeth 22. That is, a circumferential dimension of the umbrella 22a is larger than a circumferential dimension of the tooth 22. A surface of the umbrella 22a facing radially inward opposes an outer peripheral surface of the rotor 3 in the radial direction with a gap interposed therebetween.

The stator coil 30 is attached to the tooth 22. A slot 29 is provided between the teeth 22 adjacent to each other in the circumferential direction. That is, the stator core 20 has a plurality of the slots 29 arranged in the circumferential direction.

A part (a straight portion 50a to be described later) of the stator coil 30 excluding a coil end is accommodated in the slot 29. Further, the insulating sheets 40 are arranged one by one in the slots 29. The insulating sheet 40 is provided in the slot 29 to ensure insulation between the stator coil 30 and the stator core 20.

One slot 29 is provided with four or more even-numbered layers (four layers in the present preferred embodiment) arranged side by side in the radial direction, that is, layers 29a, 29b, 29c, and 29d. Here, the four layers are respectively referred to as a first layer 29a, a second layer 29b, a third layer 29c, and a fourth layer 29d from the outside to the inside in the radial direction. When counted from the radially outer side, the first layer 29a is the first layer, the second layer 29b is the second layer, the third layer 29c is the third layer, and the fourth layer 29d is the fourth layer.

A width dimension of the slot 29 of the present preferred embodiment along the circumferential direction is slightly larger than a dimension of the conductor 50 along the circumferential direction. In one slot, one conductor 50 is arranged in each of the layers 29a, 29b, 29c, and 29d. In the slot 29, four conductors 50 are arranged in a row along the radial direction.

The slot 29 includes an opening 29h that is open radially inward. The opening 29h is located between the umbrellas 22a located at the tips of the adjacent teeth 22. A width dimension of the opening 29h along the circumferential direction is smaller than a dimension of the conductor 50 along the circumferential direction. For this reason, the conductor 50 hardly passes through the opening 29h, and the conductor 50 is prevented from being separated from the stator core 20.

In the present preferred embodiment, the stator core 20 has 48 teeth 22. That is, the stator 10 of the present preferred embodiment has 48 slots. Note that the number of slots of the stator 10 is appropriately set according to the number of poles of the rotor magnet 3b and a method for winding the stator coil 30.

Figure 4:
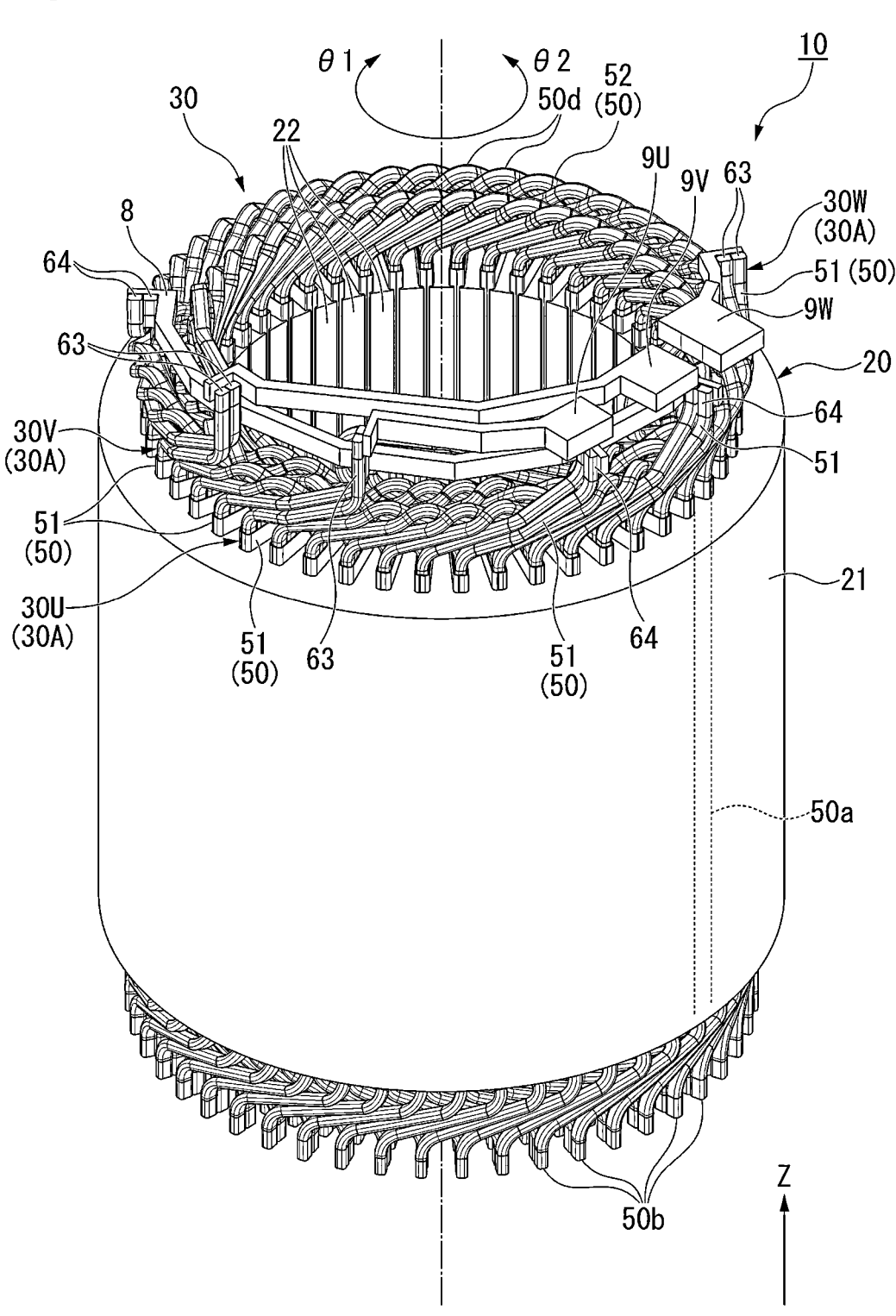
FIG. 4 is a perspective view of the stator according to the preferred embodiment.
Figure 5:
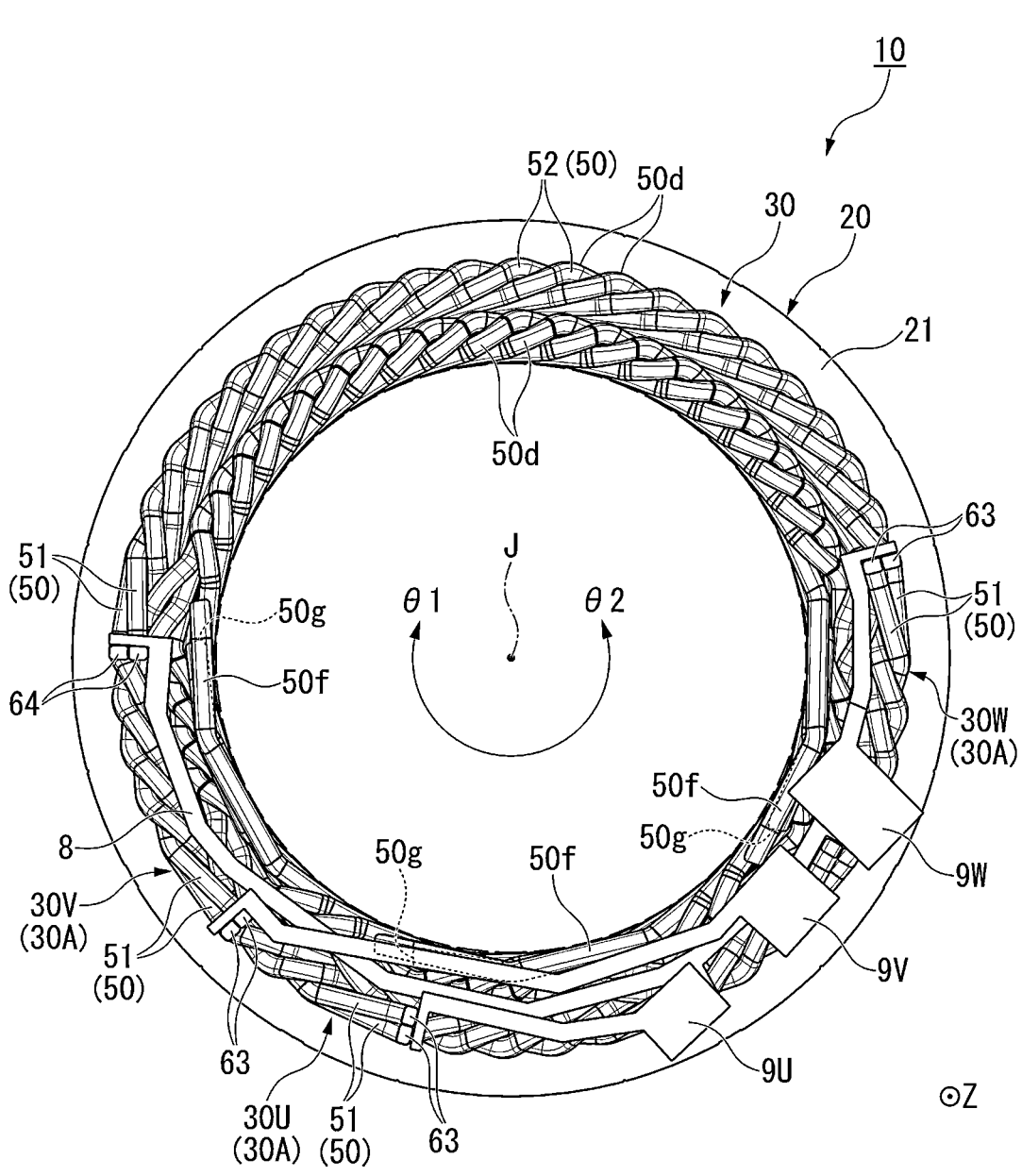
FIG. 5 is a plan view of the stator according to the embodiment.

FIG. 4 is a perspective view of the stator 10. FIG. 5 is a plan view of the stator 10.

The stator coil 30 of the present preferred embodiment has three-phase phase coil portions 30A that are star-connected. That is, one ends of the three-phase phase coil portions 30A are connected to each other at one point to form a neutral point, and an alternating current flows through the other ends of the three-phase phase coil portions 30A. Each of the three-phase phase coil portions 30A is attached to the stator core 20. Hereinafter, in a case where the three-phase phase coil portions 30A are distinguished from each other, these are referred to as a U-phase coil portion 30U, a V-phase coil portion 30V, and a W-phase coil portion 30W, respectively.

Note that the phase coil portions 30A provided in the stator 10 of the present preferred embodiment have three phases, but may have five phases, for example. That is, the stator 10 includes phase coil portions 30A of a plurality of phases such as three phases or five phases.

A U-phase bus bar (phase bus bar) 9U is connected to the U-phase coil portion 30U. An alternating current flows through the U-phase coil portion 30U via the U-phase bus bar 9U. A V-phase bus bar (phase bus bar) 9V is connected to the V-phase coil portion 30V. An alternating current flows through the V-phase coil portion 30V via the V-phase bus bar 9V. A W-phase bus bar (phase bus bar) 9W is connected to the W-phase coil portion 30W. An alternating current flows through the W-phase coil portion 30W via the W-phase bus bar 9W. Phases of the alternating currents flowing through the U-phase coil portion 30U, the V-phase coil portion 30V, and the W-phase coil portion 30W are shifted each by 120°. Further, a neutral-point bus bar 8 is connected to the U-phase coil portion 30U, the V-phase coil portion 30V, and the W-phase coil portion 30W. The neutral-point bus bar 8 forms a neutral point of a three-phase circuit.

Figure 6:
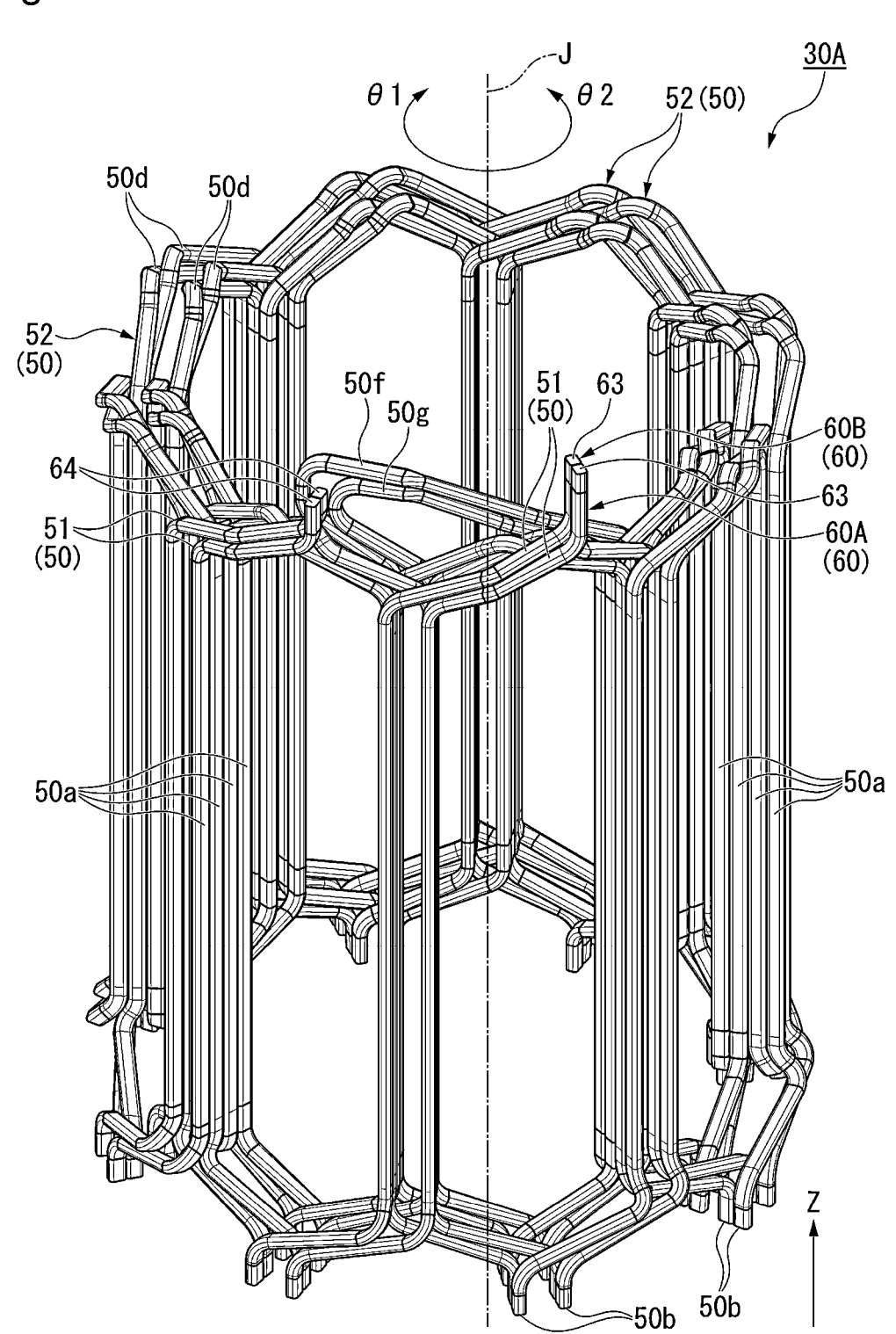
FIG. 6 is a perspective view illustrating a phase coil portion of the preferred embodiment.

FIG. 6 is a perspective view of one phase coil portion 30A among the three-phase phase coil portions 30A. Hereinafter, a specific configuration of the phase coil portion 30A will be described. The phase coil portion 30A to be described hereinafter may be any of the U-phase coil portion 30U, the V-phase coil portion 30V, and the W-phase coil portion 30W.

One phase coil portion 30A has at least two or more conductor connection bodies 60. In the present preferred embodiment, the phase coil portion 30A includes two conductor connection bodies 60. The conductor connection body 60 is configured by connecting the plurality of conductors 50 in series.

In the following description, in a case where two conductor connection bodies 60 are distinguished from each other, one is referred to as a first conductor connection body 60A and the other is referred to as a second conductor connection body 60B.

Figure 10:
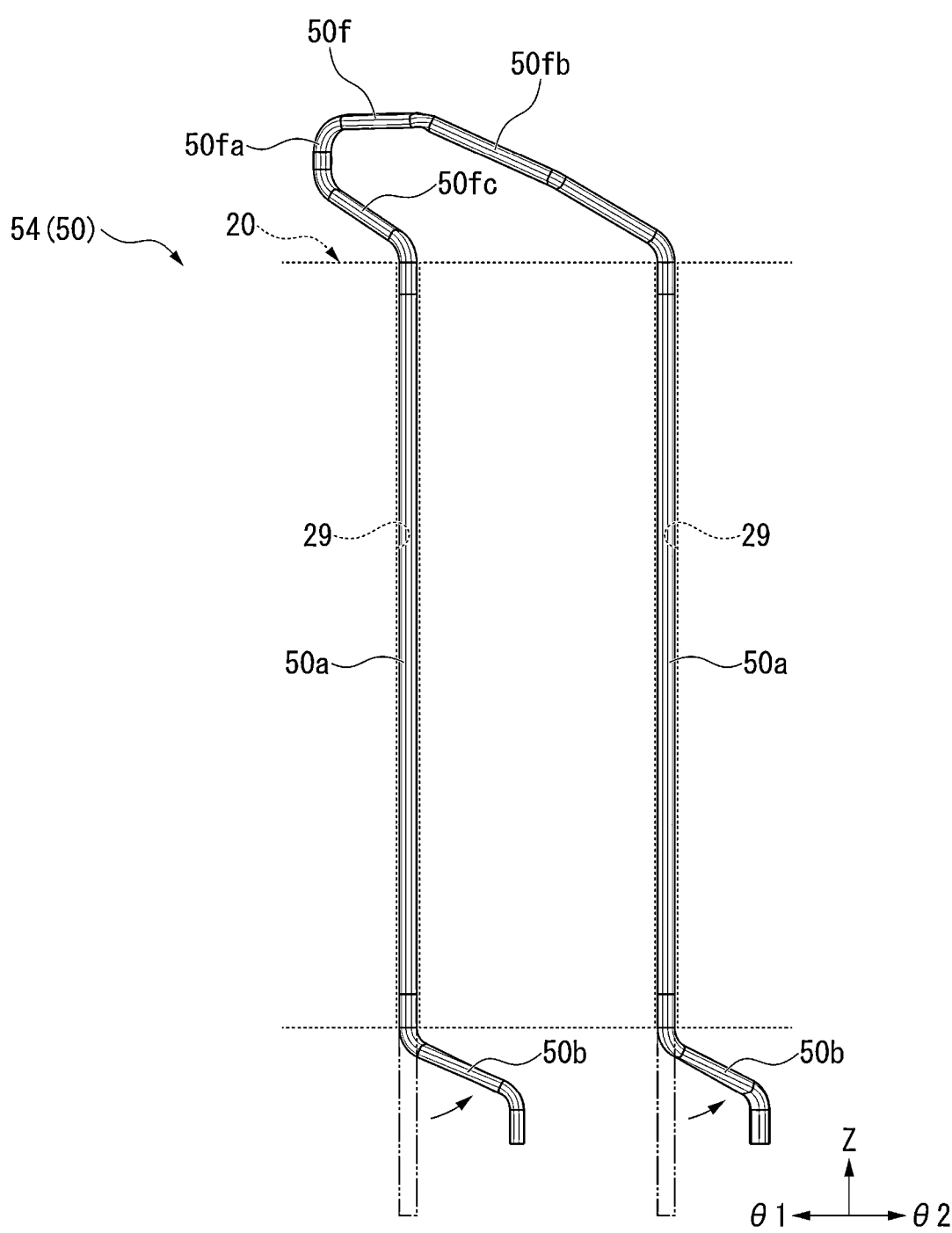
FIG. 10 is a perspective view illustrating a first folded conductor according to the preferred embodiment.
Figure 11:
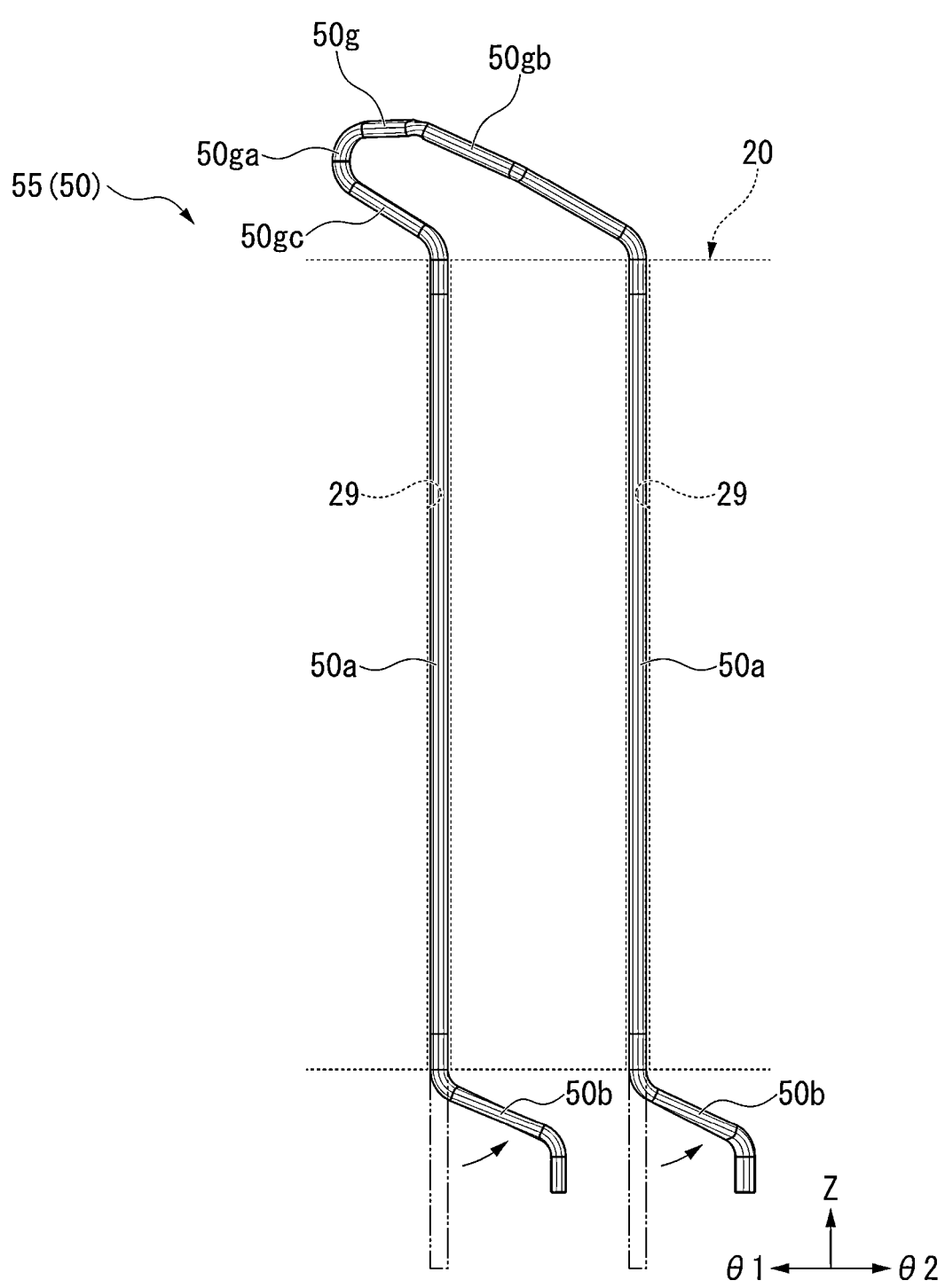
FIG. 11 is a perspective view illustrating a second folded conductor according to the preferred embodiment.
Figure 12:
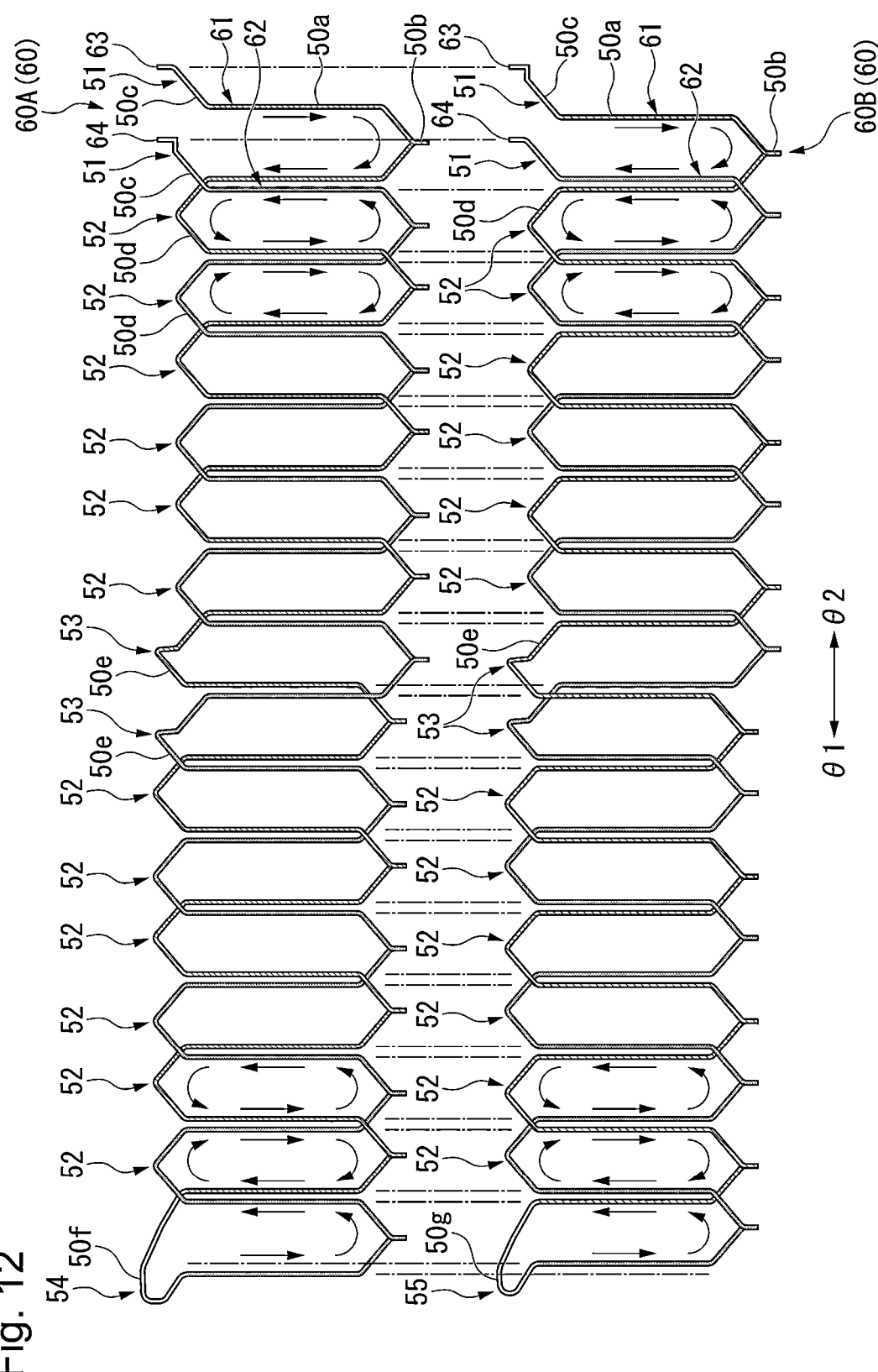
FIG. 12 is a schematic view illustrating configurations of a first conductor connection body and a second conductor connection body according to the preferred embodiment.

FIGS. 7 to 11 are front views of the conductors 50 constituting the conductor connection body 60 as viewed from the radially outer side. FIG. 12 is a schematic view illustrating configurations of the first conductor connection body 60A and the second conductor connection body 60B.

The conductor 50 is configured by winding a flat wire. Accordingly, a space factor of the conductors 50 in the slot 29 can be improved as compared with the case of using a round wire. Note that the "flat wire" in the present specification is a wire rod of which a cross-sectional shape is a quadrangular shape or a substantially quadrangular shape. In the present specification, the "substantially quadrangular shape" includes a rounded quadrangular shape in which corners of a quadrangular shape are rounded. Although not illustrated, the conductor 50 in the preferred embodiment has an enamel coating on the surface.

The plurality of conductors 50 constituting the conductor connection body 60 are classified into an end conductor 51 (FIG. 7), a hairpin conductor 52 (FIG. 8), an interlayer hairpin conductor 53 (FIG. 9), a first folded conductor 54 (FIG. 10), and a second folded conductor 55.

As illustrated in FIGS. 7 to 11, each of the various conductors 50 includes at least a straight portion 50a extending straight along the axial direction (Z-axis direction) and a connection portion 50b located at an end on the lower side (the other side in the axial direction). The straight portion 50a passes through the slot 29. That is, the conductor 50 is accommodated in the slot 29 in the straight portion 50a.

The connection portion 50b is connected to the connection portion 50b of another conductor 50. The connection portions 50b of the pair of conductors 50 are joined to each other by means such as welding. The connection portion 50b is bent in the circumferential direction after the conductor 50 is mounted on the stator core 20, and welded to the connection portion 50b of another conductor 50. As indicated by a two-dot chain line in FIGS. 7 to 11, in the conductor 50 before being mounted on the stator core 20, the connection portion 50b has a linear or substantially linear shape continuous with the straight portion 50a. The conductor 50 is attached to the stator core 20 by inserting the connection portion 50b and the straight portion 50a into the slot 29 from the upper side (one side in the axial direction) of the stator core 20. The connection portion 50b is bent in the circumferential direction and welded to another connection portion 50b, so that the conductor 50 is prevented from being axially detached from the stator core 20.

The plurality of conductors 50 are inserted into the slots 29 of the stator core 20 from the upper side and welded on the lower side, whereby the stator 10 of the present preferred embodiment can be assembled. For this reason, a complicated assembly process is not required, and an assembly process can be simplified.

Figure 7:
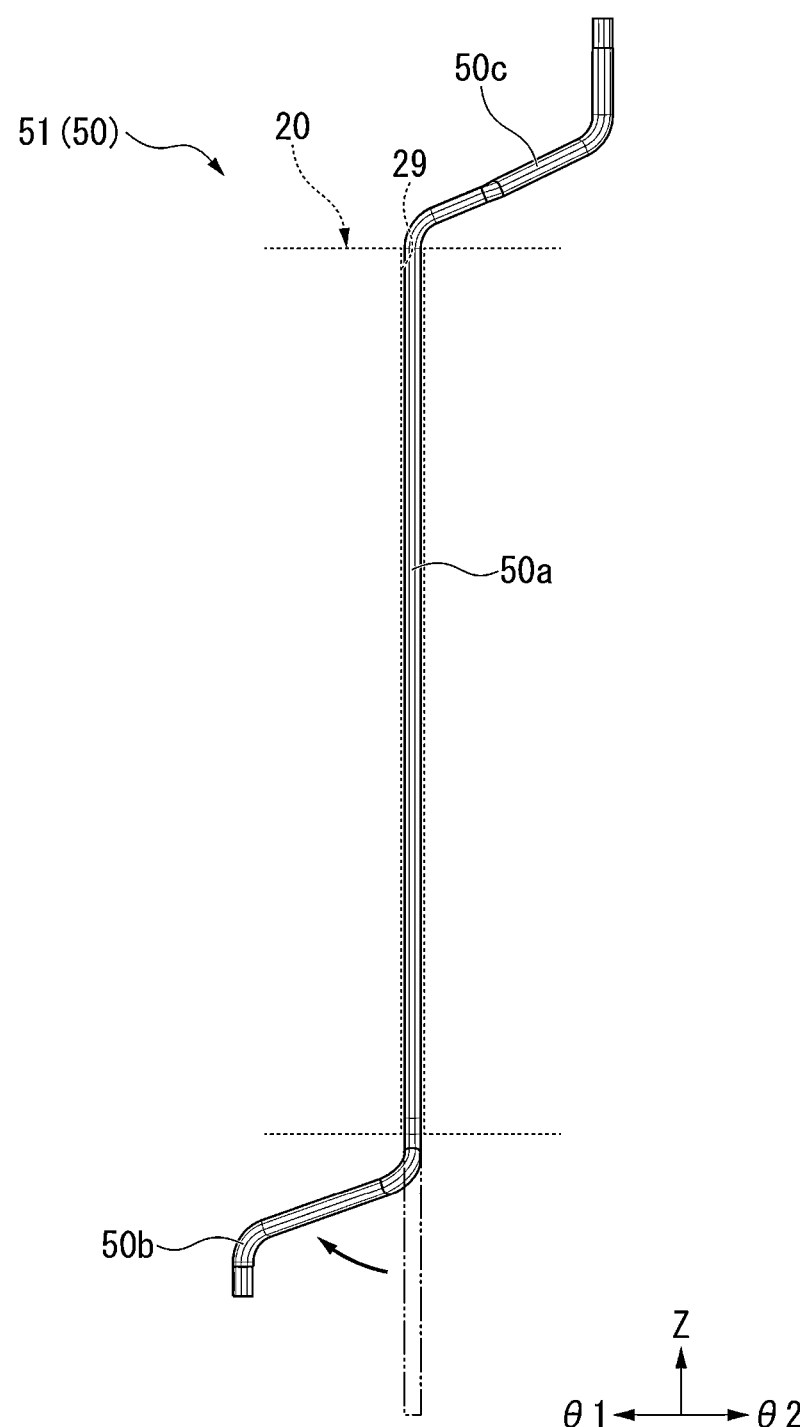
FIG. 7 is a front view of an end conductor according to the preferred embodiment.

As illustrated in FIG. 7, the end conductor 51 includes one terminal portion 50c, one straight portion 50a, and one connection portion 50b. The terminal portion 50c is located at an upper end of the end conductor 51. The terminal portion 50c is bent in the circumferential direction with respect to the straight portion 50a. In the end conductor 51, the terminal portion 50c and the connection portion 50b are bent in directions opposite to each other in the circumferential direction. In the end conductor 51, the terminal portion 50c extends from an upper end of the straight portion 50a to the other side θ2 in the circumferential direction, and the connection portion 50b extends from a lower end of the straight portion 50a to the one side θ1 in the circumferential direction.

Any one of the neutral-point bus bar 8, the U-phase bus bar 9U, the V-phase bus bar 9V, and the W-phase bus bar 9W is connected to the terminal portion 50c. As illustrated in FIG. 12, two end conductors 51 are provided in each of the first conductor connection body 60A and the second conductor connection body 60B.

Figure 8:
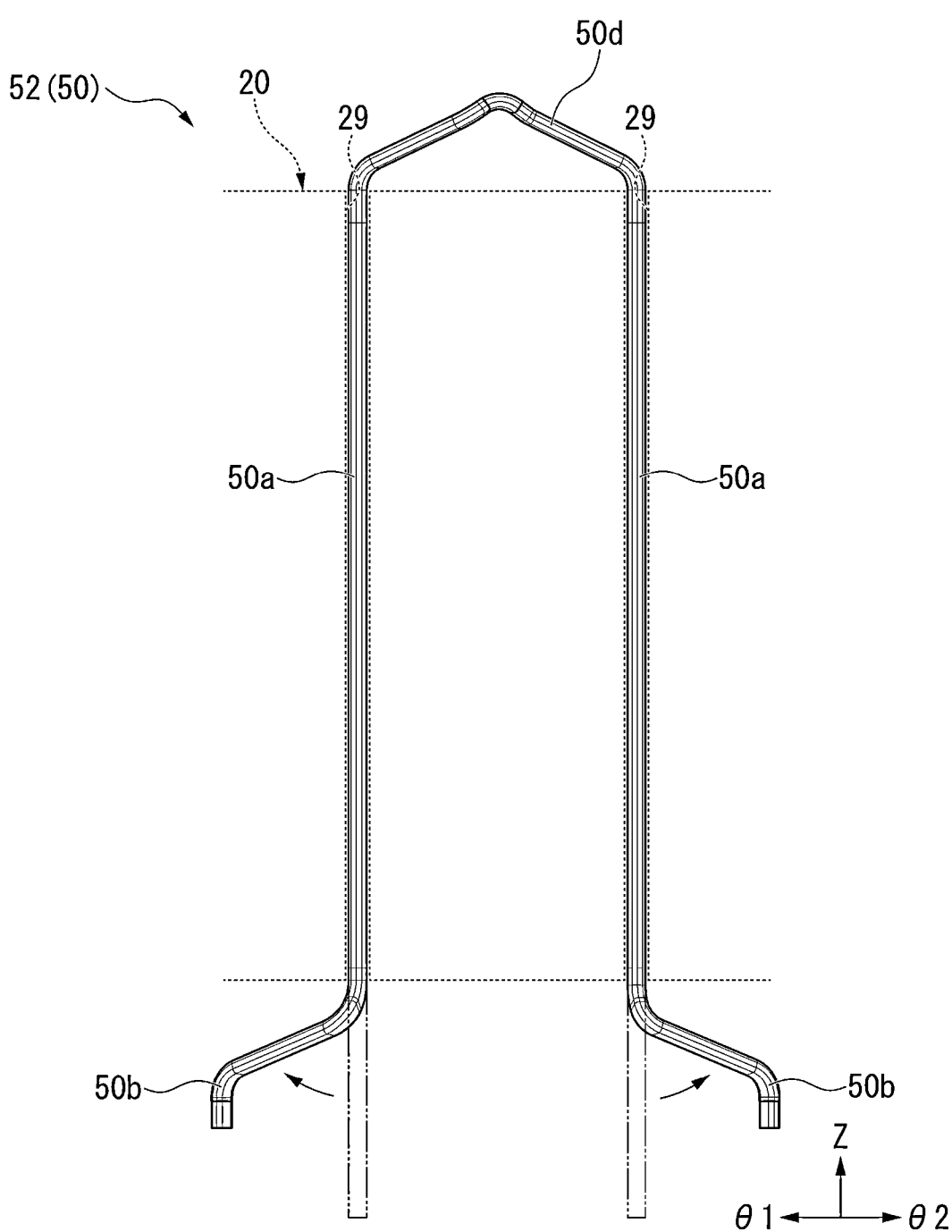
FIG. 8 is a front view of a hairpin conductor according to the preferred embodiment.

As illustrated in FIG. 8, the hairpin conductor 52 includes two straight portions 50*a*, two connection portions 50*b*, and one curved portion 50*d*. The curved portion 50*d* is arranged at an upper end of hairpin conductor 52. The curved portion 50*d* extends across the two straight portions 50*a*. That is, the two straight portions 50*a* are connected to each other through the curved portion 50*d* in the hairpin conductor 52. In the hairpin conductor 52, the two connection portions 50*b* are connected to lower ends of the straight portions 50*a* different from each other.

In the hairpin conductor 52, the two connection portions 50*b* are arranged with the number of slots per pole. Here, the number of slots per pole means the number of slots 29 of the stator 10 arranged within one magnetic pole of the rotor 3 in the combination of the rotor 3 and the stator 10. The number of slots per pole is calculated by (the total number of slots of the stator 10)/(the number of magnetic poles of the rotor 3). In the present preferred embodiment, the number of magnetic poles of the rotor 3 is eight, and the number of slots of the stator 10 is 48, so that the number of slots per pole is six. In the hairpin conductor 52, the two connection portions 50*b* are separated from each other by six slots in the circumferential direction.

In the hairpin conductor 52, the two connection portions 50*b* are bent in directions opposite to each other in the circumferential direction. Out of the two connection portions 50*b*, one located on the one side θ1 in the circumferential direction extends from the lower end of the straight portion 50*a* to the one side θ1 in the circumferential direction, and the other located on the other side θ2 in the circumferential direction extends from the lower end of the straight portion 50*a* to the other side θ2 in the circumferential direction. As illustrated in FIG. 12, twelve hairpin conductors 52 are provided in each of the first conductor connection body 60A and the second conductor connection body 60B.

Figure 9:
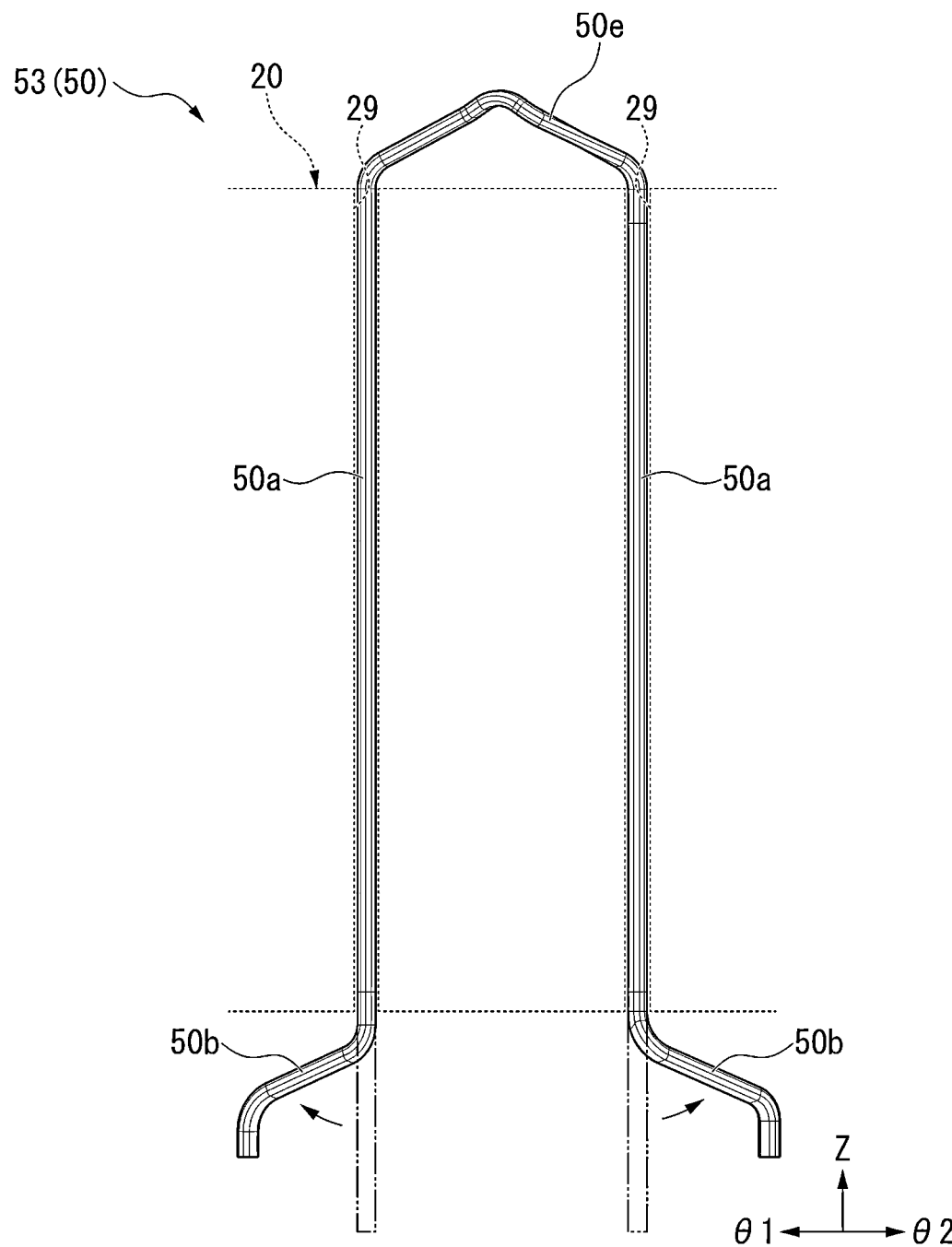
FIG. 9 is a front view of an interlayer hairpin conductor according to the preferred embodiment.

As illustrated in FIG. 9, the interlayer hairpin conductor 53 includes two straight portions 50*a*, two connection portions 50*b*, and one interlayer curved portion 50*e*. The interlayer curved portion 50*e* is arranged at an upper end of the interlayer hairpin conductor 53. The interlayer curved portion 50*e* extends across the two straight portions 50*a*. That is, the two straight portions 50*a* are connected to each other through the interlayer curved portion 50*e* in the interlayer hairpin conductor 53.

In the interlayer hairpin conductor 53, the two connection portions 50*b* are arranged with the number of slots per pole (six slots in the present preferred embodiment). In the interlayer hairpin conductor 53, the two connection portions 50*b* are bent in directions opposite to each other in the circumferential direction. Out of the two connection portions 50*b*, one located on the one side el in the circumferential direction extends from the lower end of the straight portion 50*a* to the one side el in the circumferential direction, and the other located on the other side θ2 in the circumferential direction extends from the lower end of the straight portion 50*a* to the other side θ2 in the circumferential direction. The interlayer hairpin conductor 53 is different from the hairpin conductor 52 mainly in terms of the configuration of the interlayer curved portion 50*e*. The interlayer curved portion 50*e* has a slightly different shape from the curved portion 50*d* of the hairpin conductor 52. As illustrated in FIG. 12, two interlayer hairpin conductors 53 are provided in each of the first conductor connection body 60A and the second conductor connection body 60B.

As illustrated in FIG. 10, the first folded conductor 54 includes two straight portions 50*a*, two connection portions

50*b*, and one first folded portion (folded portion) 50*f*. As illustrated in FIG. 11, the second folded conductor 55 includes two straight portions 50*a*, two connection portions 50*b*, and one second folded portion (folded portion) 50*g*. The first folded portion 50*f* and the second folded portion 50*g* each are arranged at an upper end of the first folded conductor 54 or the second folded conductor 55.

The first folded portion 50*f* and the second folded portion 50*g* extend across the two straight portions 50*a* to each other. That is, in the first folded conductor 54 and the second folded conductor 55, the two straight portions 50*a* are connected to each other through the first folded portion 50*f* or the second folded portion 50*g*.

In the first folded conductor 54 and the second folded conductor 55, two connection portions 50*b* are bent in the other side θ2 in the circumferential direction. That is, in the first folded conductor 54 and the second folded conductor 55, the two connection portions 50*b* extend from the lower end of the straight portion 50*a* to the other side θ2 in the circumferential direction.

In the first folded conductor 54 and the second folded conductor 55, distances between the two connection portions 50*b* are different from each other. In the first folded conductor 54, the two connection portions 50*b* are arranged with the number of slots per pole+1 (seven slots in the present preferred embodiment). On the other hand, in the second folded conductor 55, the two connection portions 50*b* are arranged with the number of slots per pole −1 (five slots in the present preferred embodiment). For this reason, the first folded portion 50*f* has a larger crossing amount in the circumferential direction by two slots than the second folded portion 50*g*.

The first folded portion 50*f* has a bent portion 50*fa* bent from the one side θ1 in the circumferential direction to the other side θ2 in the circumferential direction, and two extending portions 50*fb* and 50*fc* connected to both ends of the bent portion 50*fa*. The first folded portion 50*f* extends from the slot 29 to the one side θ1 in the circumferential direction in the two extending portions 50*fb* and 50*fc*. The two extending portions 50*fb* and 50*fc* extend in parallel to each other before and after the bent portion 50*fa*.

The second folded portion 50*g* has a bent portion 50*ga* bent from the one side θ1 in the circumferential direction to the other side θ2 in the circumferential direction, and two extending portions 50*gb* and 50*gc* connected to both ends of the bent portion 50*ga*. The second folded portion 50*g* extends from the slot 29 to the one side θ1 in the circumferential direction in the two extending portions 50*gb* and 50*gc*. The two extending portions 50*gb* and 50*gc* extend in parallel to each other before and after the bent portion 50*ga*.

As illustrated in FIG. 12, one first folded conductor 54 is provided in the first conductor connection body 60A. On the other hand, one second folded conductor 55 is provided in the second conductor connection body 60B.

As illustrated in FIG. 12, in the first conductor connection body 60A, two end conductors 51 are arranged at terminals of both ends of the first conductor connection body 60A, and the first folded conductor 54 is arranged substantially in the middle.

The first conductor connection body 60A includes the two end conductors 51, the twelve hairpin conductors 52, the two interlayer hairpin conductors 53, and the first folded conductor 54. In the first conductor connection body 60A, one end conductor 51, three hairpin conductors 52, one interlayer hairpin conductor 53, three hairpin conductors 52, the first folded conductor 54, three hairpin conductors 52, one interlayer hairpin conductor 53, three hairpin conductors 52, and the other end conductor 51 are connected in this order.

The first conductor connection body 60A includes the plurality of (32) straight portions 50a, the plurality of (fourteen) curved portions 50d and 50e extending across the straight portions 50a on the upper side (one side in the axial direction) of the stator core 20, and the plurality of (sixteen) connection portions 50b that connect the conductors 50 to each other on the lower side (other side in the axial direction) of the stator core 20.

The first conductor connection body 60A is wave-wound every six slots toward the one side θ1 in the circumferential direction from one terminal portion 50c to the first folded portion 50f. Further, the first conductor connection body 60A is wave-wound every six slots toward the other side θ2 in the circumferential direction from the first folded portion 50f to the other terminal portion 50c.

Here, between the two end conductors 51, one terminal portion 50c connected to any of the phase bus bars 9U, 9V, and 9W is referred to as an input-side terminal portion (first terminal portion) 63, and the other terminal portion 50c connected to the neutral-point bus bar 8 is referred to as a neutral-point-side terminal portion (second terminal portion) 64. Furthermore, a region of the first conductor connection body 60A that is wave-wound on the one side θ1 in the circumferential direction between the input-side terminal portion 63 and the first folded portion 50f is referred to as a first part 61. At this point, in the first conductor connection body 60A, the region that is wave-wound on the other side θ2 in the circumferential direction between the first folded portion 50f and the neutral-point-side terminal portion 64 is referred to as a second part 62. When the one side θ1 in the circumferential direction is defined as a forward direction and the other side θ2 in the circumferential direction is defined as a reverse direction, the first part 61 can be referred to as a forward-direction portion, and the second part 62 can be referred to as a reverse-direction portion.

The first conductor connection body 60A includes: the input-side terminal portion 63; the first part 61 wave-wound from the input-side terminal portion 63 to the one side θ1 in the circumferential direction; the first folded portion 50f connected to an end of the first part 61 on the one side θ1 in the circumferential direction; the second part 62 wave-wound from the first folded portion 50f to the other side θ2 in the circumferential direction; and the neutral-point-side terminal portion 64 connected to an end of the second part 62 on the other side θ2 in the circumferential direction.

Figure 13:
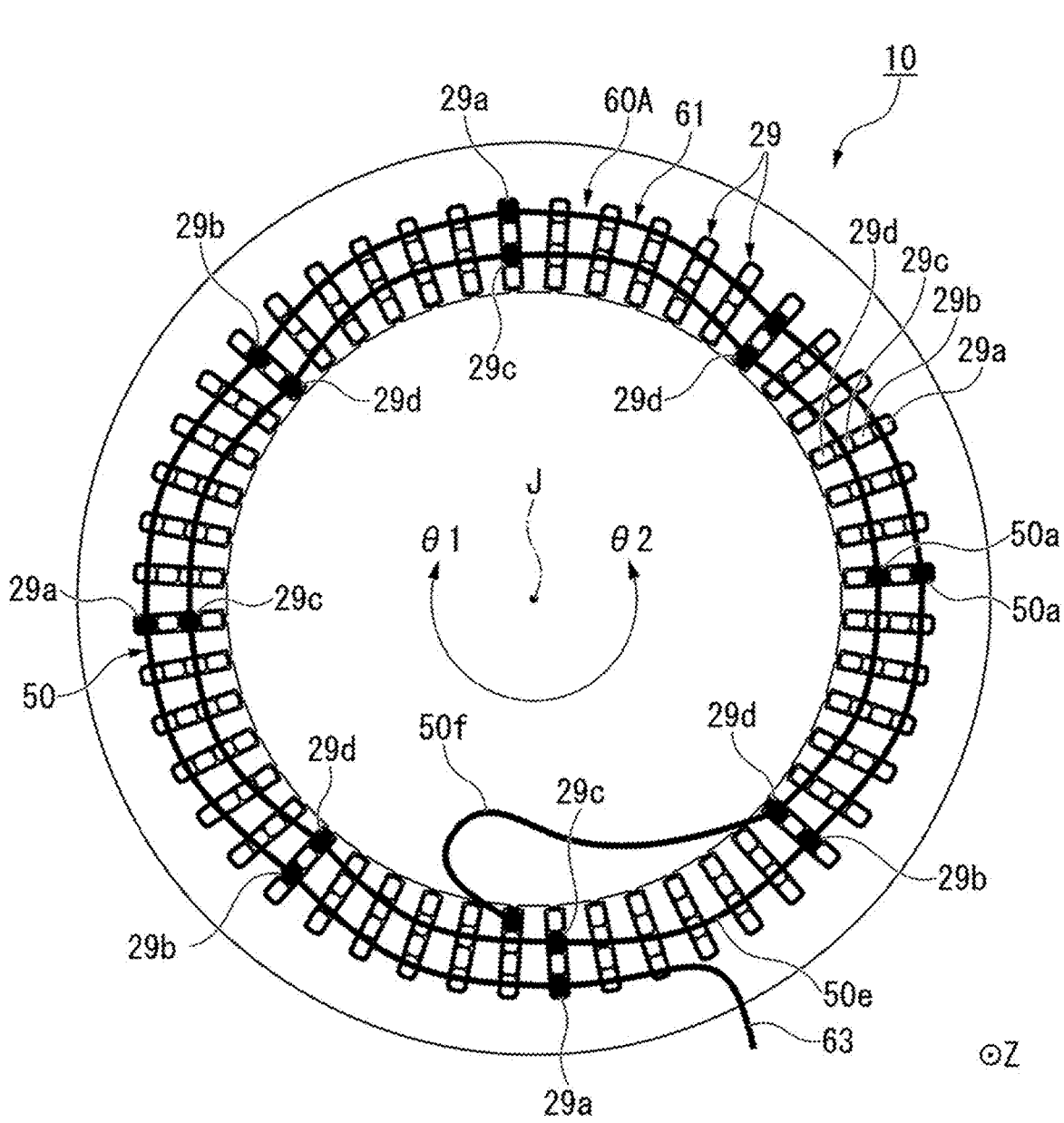
FIG. 13 is a schematic view illustrating an arrangement in a slot through which a straight portion of a first part of the first conductor connection body according to the preferred embodiment passes.
Figure 14:
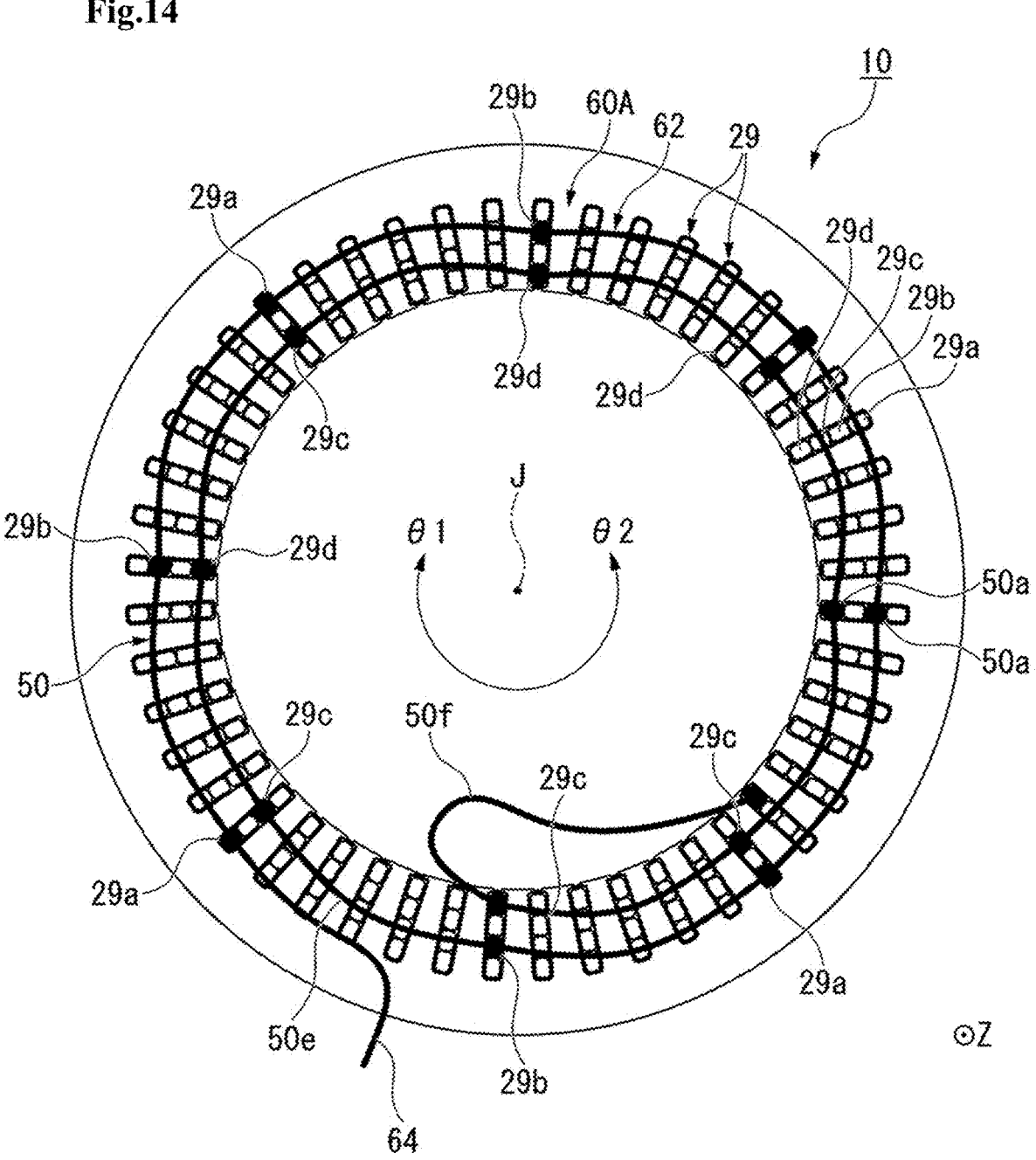
FIG. 14 is a schematic view illustrating an arrangement in a slot through which a straight portion of a second part of the first conductor connection body according to the preferred embodiment passes.

FIG. 13 is a schematic view illustrating an arrangement in the slot 29 through which the straight portion 50a of the first part 61 of the first conductor connection body 60A passes. FIG. 14 is a schematic view illustrating an arrangement in the slot 29 through which the straight portion 50a of the second part 62 of the first conductor connection body 60A passes.

As illustrated in FIG. 13, the first conductor connection body 60A is wound only by two turns to the one side θ1 in the circumferential direction in the first part 61. Note that the first part 61 may be wound by two or more turns. Further, the first conductor connection body 60A is wound only by two turns to the other side θ2 in the circumferential direction in the second part 62 as illustrated in FIG. 14. Note that the second part 62 only needs to be wound to the other side θ2 in the circumferential direction by the same number of turns as the first part 61.

The first part 61 and the second part 62 of the first conductor connection body 60A each have the interlayer curved portion 50e at a boundary where turns change. Here, the "boundary where turns change" means a region where the number of turns changes, such as a boundary between the first turn and the second turn around the central axis J and a boundary between the N-th turn and the (N+1)-th turn in routing of the first part 61 and the second part 62.

As illustrated in FIG. 13, the first conductor connection body 60A is wound by causing the straight portions 50a arranged in the circumferential direction to alternately pass through the first layer 29a and the second layer 29b between the input-side terminal portion 63 and the interlayer curved portion 50e. The first conductor connection body 60A extends from the second layer 29b to the third layer 29c in the interlayer curved portion 50e of the first part 61. The first conductor connection body 60A is wound by causing the straight portions 50a arranged in the circumferential direction to alternately pass through the third layer 29c and the fourth layer 29d between the interlayer curved portion 50e and the first folded portion 50f. In the first part 61 of the first conductor connection body 60A, the straight portions 50a pass through the same slots 29 in the first turn and the second turn.

As illustrated in FIG. 14, the first conductor connection body 60A is wound by causing the straight portions 50a arranged in the circumferential direction to alternately pass through the third layer 29c and the fourth layer 29d between the first folded portion 50f and the interlayer curved portion 50e. The first conductor connection body 60A extends from the third layer 29c to the second layer 29b in the interlayer curved portion 50e of the second part 62. The first conductor connection body 60A is wound by causing the straight portions 50a arranged in the circumferential direction to alternately pass through the first layer 29a and the second layer 29b between the interlayer curved portion 50e and the neutral-point-side terminal portion 64. In the second part 62 of the first conductor connection body 60A, the straight portions 50a pass through the same slots 29 in the first turn and the second turn.

The second conductor connection body 60B has substantially the same configuration as the first conductor connection body 60A, but has main differences in terms of a configuration of a folded portion, a position of the slot 29 through which the second conductor connection body 60B passes, and the like.

As illustrated in FIG. 12, in the second conductor connection body 60B, the two end conductors 51 are arranged at terminals of both ends of the second conductor connection body 60B, and the second folded conductor 55 is arranged substantially in the middle.

The second conductor connection body 60B includes the two end conductors 51, the twelve hairpin conductors 52, the two interlayer hairpin conductors 53, and the second folded conductor 55. In the second conductor connection body 60B, one end conductor 51, three hairpin conductors 52, one interlayer hairpin conductor 53, three hairpin conductors 52, the second folded conductor 55, three hairpin conductors 52, one interlayer hairpin conductor 53, three hairpin conductors 52, and the other end conductor 51 are connected in this order.

The second conductor connection body 60B includes the plurality of (32) straight portions 50a, the plurality of (fourteen) curved portions 50d and 50e extending across the straight portions 50a on the upper side (one side in the axial direction) of the stator core 20, and the plurality of (sixteen) connection portions 50b that connect the conductors 50 to each other on the lower side (other side in the axial direction) of the stator core 20.

The second conductor connection body 60B is wave-wound every six slots toward the one side θ1 in the circumferential direction (in the first part 61) from the input-side terminal portion 63, which is one terminal portion 50c, to the second folded portion 50g. Further, the second conductor connection body 60B is wave-wound every six slots toward the other side θ2 in the circumferential direction (in the second part 62) from the second folded portion 50g to the neutral-point-side terminal portion 64 which is the other terminal portion 50c. That is, the second conductor connection body 60B includes: the input-side terminal portion 63; the first part 61 wave-wound from the input-side terminal portion 63 to the one side θ1 in the circumferential direction; the second folded portion 50g connected to an end of the first part 61 on the one side θ1 in the circumferential direction; the second part 62 wave-wound from the second folded portion 50g to the other side θ2 in the circumferential direction; and the neutral-point-side terminal portion 64 connected to an end of the second part 62 on the other side θ2 in the circumferential direction.

Figure 15:
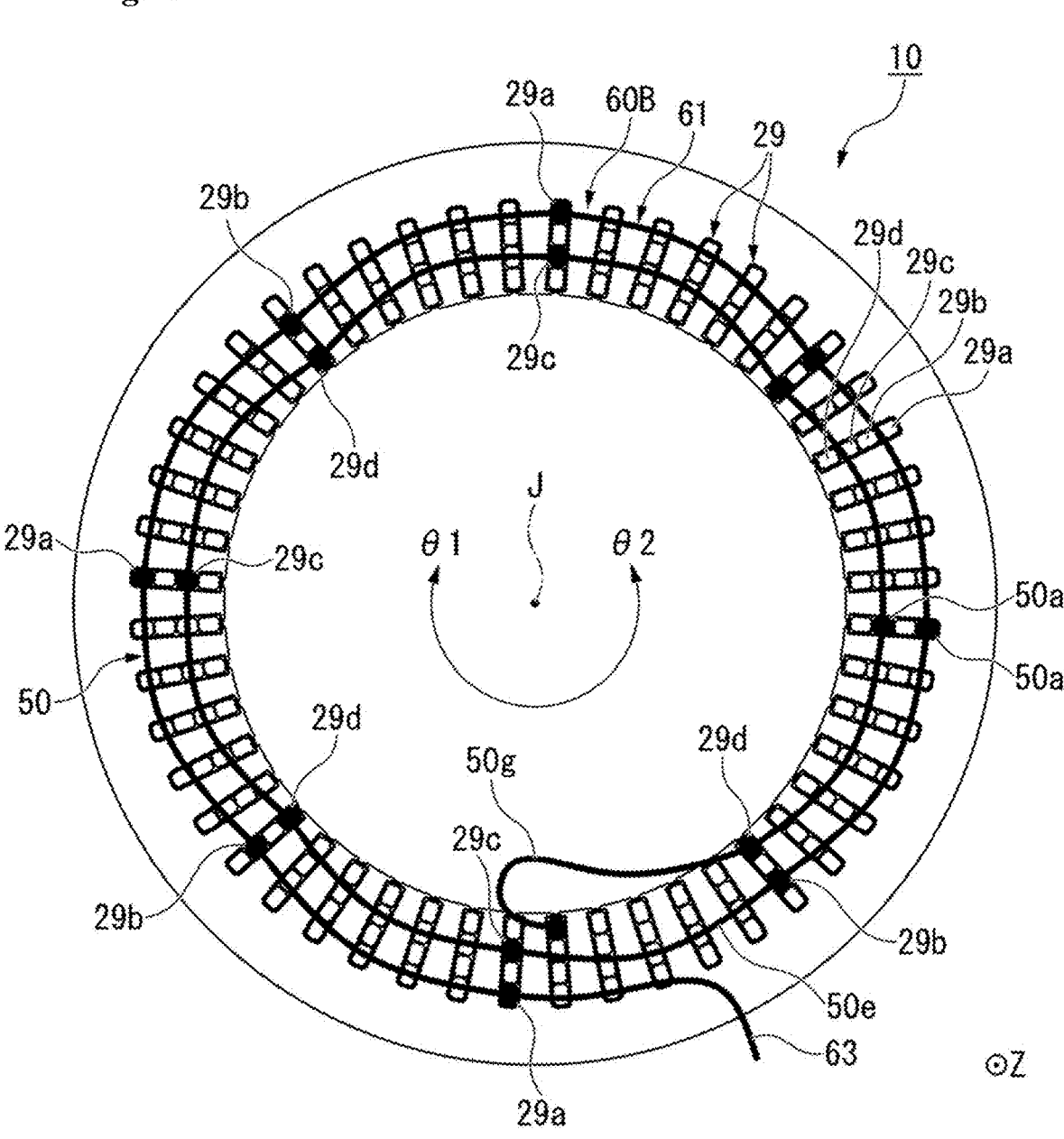
FIG. 15 is a schematic view illustrating an arrangement in a slot through which a straight portion of a first part of the second conductor connection body according to the preferred embodiment passes.
Figure 16:
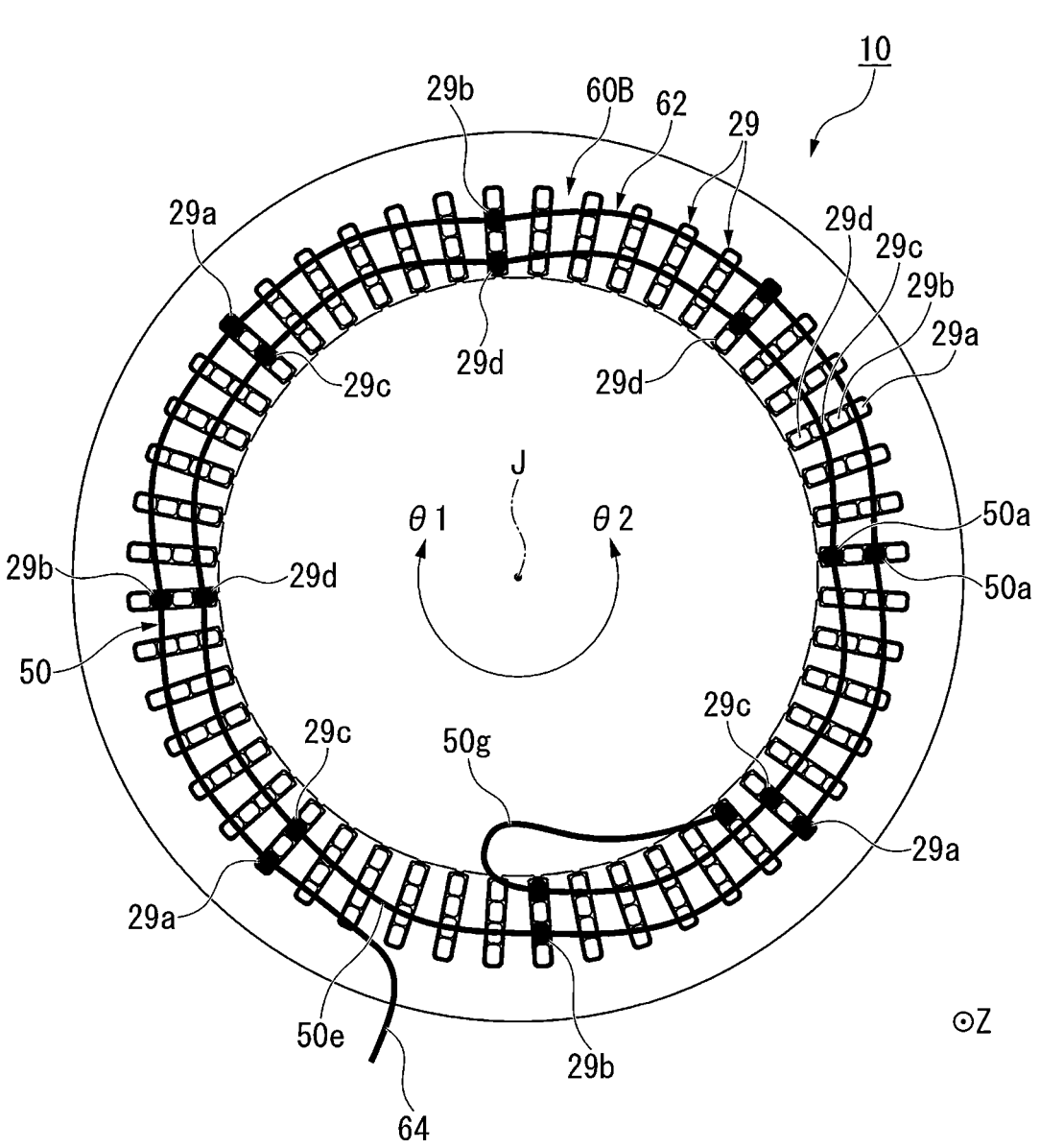
FIG. 16 is a schematic view illustrating an arrangement in a slot through which a straight portion of a second part of the second conductor connection body according to the preferred embodiment passes.

FIG. 15 is a schematic view illustrating an arrangement in the slot 29 through which the straight portion 50a of the first part of the second conductor connection body 60B passes. FIG. 16 is a schematic view illustrating an arrangement in the slot 29 through which the straight portion 50a of the second part of the second conductor connection body 60B passes.

The second conductor connection body 60B is wound by two turns to the one side θ1 in the circumferential direction in the first part 61, and is wound by the same number of turns (that is, two turns) as the first part 61 to the other side θ2 in the circumferential direction in the second part 62.

The first part 61 and the second part 62 of the second conductor connection body 60B each have the interlayer curved portion 50e at a boundary where turns change. The second conductor connection body 60B is wound by causing the straight portions 50a arranged in the circumferential direction to alternately pass through the first layer 29a and the second layer 29b between the input-side terminal portion 63 and the interlayer curved portion 50e. The second conductor connection body 60B extends from the second layer 29b to the third layer 29c in the interlayer curved portion 50e of the first part 61. The second conductor connection body 60B is wound by causing the straight portions 50a arranged in the circumferential direction to alternately pass through the third layer 29c and the fourth layer 29d between the interlayer curved portion 50e and the second folded portion 50g. In the first part 61 of the second conductor connection body 60B, the straight portions 50a pass through the same slots 29 in the first turn and the second turn.

As illustrated in FIG. 16, the second conductor connection body 60B is wound by causing the straight portions 50a arranged in the circumferential direction to alternately pass through the third layer 29c and the fourth layer 29d between the second folded portion 50g and the interlayer curved portion 50e. The second conductor connection body 60B extends from the third layer 29c to the second layer 29b in the interlayer curved portion 50e of the second part 62. The second conductor connection body 60B is wound by causing the straight portions 50a arranged in the circumferential direction to alternately pass through the first layer 29a and the second layer 29b between the interlayer curved portion 50e and the neutral-point-side terminal portion 64. In the second part 62 of the second conductor connection body 60B, the straight portions 50a pass through the same slots 29 in the first turn and the second turn.

According to the present preferred embodiment, the conductor connection body 60 is wound by two turns in the first part 61 and the second part 62. For this reason, the density of a magnetic flux generated in the stator 10 can be increased as compared with a case where the conductor connection body 60 is wound only by one turn, so that the high output of the motor 1 can be achieved.

Note that the conductor connection body 60 may be wound by two or more turns in the first part 61 and the second part 62. For example, it is assumed that the conductor connection body 60 is wound in the first part 61 and the second part 62 by N turns (N is a natural number). Further, M is assumed to be an odd natural number (1, 3, 5, or the like). In the N-th turn (for example, the first turn), the conductor connection body 60 is wound by one turn by causing the straight portions 50a arranged in the circumferential direction to alternately pass through the M-th layer (for example, the first layer) and the (M+1)-th layer (for example, the second layer). The conductor connection body 60 includes the interlayer curved portion 50e extending to straddle the (M+1)-th layer (for example, the second layer) and the (M+2)-th layer (for example, the third layer) at a boundary between the N-th turn (for example, the first turn) and the (N+1)-th turn (for example, the second turn). According to the present preferred embodiment, the phase coil portion 30A can be simply configured even when the conductor connection body 60 is wound by two or more turns.

As illustrated in FIGS. 13 and 14, in the first part 61 and the second part 62 of the first conductor connection body 60A, the plurality of straight portions 50a are arranged in the circumferential direction with the number of slots per pole (six slots in the present preferred embodiment). That is, the first conductor connection body 60A is wound around the stator core 20 in a so-called full-pitch winding. In the full-pitch winding, the conductors 50 of the same phase are arranged in one slot 29, and it is easy to secure insulation among the U phase, the V phase, and the W phase, and the performance of the motor 1 can be stabilized.

In the first part 61 of the conductor connection body 60, the straight portion 50a passes through the same slot 29 for every turn. Similarly, in the second part 62 of the conductor connection body 60, the straight portion 50a passes through the same slot 29 for every turn. Therefore, the conductor connection body 60 has a configuration in which the conductors 50 are stacked in the radial direction in the first part 61 and the second part 62. As a result, the density of the magnetic flux generated by a current flowing through each of the conductors 50 can be increased according to the number of turns of the conductor connection body 60.

As illustrated in FIG. 12, the first part 61 of the first conductor connection body 60A and the first part 61 of the second conductor connection body 60B pass through slots 29 different from each other. Similarly, the second part 62 of the first conductor connection body 60A and the second part 62 of the second conductor connection body 60B pass through slots 29 different from each other. In the first part 61 of the second conductor connection body 60B, the slot 29 through which the straight portion 50a passes is shifted by one slot to the one side θ1 in the circumferential direction with respect to that in the first part 61 of the first conductor connection body 60A. On the other hand, in the second part 62 of the second conductor connection body 60B, the slot 29 through which the straight portion 50a passes is shifted by one slot to the other side θ2 in the circumferential direction with respect to that in the second part 62 of the first conductor connection body 60A. That is, the first parts 61 of the plurality of conductor connection bodies 60 having the same phase are sequentially arranged in the slots 29 arranged one by one to the one side θ1 in the circumferential direction. Further, the second parts 62 of the plurality of conductor connection bodies 60 having the same phase are sequentially arranged in the slots 29 arranged one by one to the other side θ2 in the circumferential direction. The first part 61 of the first conductor connection body 60A and the second part 62 of the second conductor connection body 60B are arranged in the same slot. Only the conductor connection bodies 60 of the same phase pass through one slot 29, so that insulation between the plurality of phase coil portions 30A can be easily secured.

In the first conductor connection body 60A, the two terminal portions 50*c* (the input-side terminal portion 63 and the neutral-point-side terminal portion 64) extend from the slots 29 separated from each other by the number of slots per pole+1 (seven slots) in the circumferential direction. Out of the two terminal portions 50*c* of the first conductor connection body 60A, the neutral-point-side terminal portion 64 located on the one side θ1 in the circumferential direction extends longer by one slot to the one side θ1 in the circumferential direction as compared with the input-side terminal portion 63 located on the other side θ2 in the circumferential direction. For this reason, the two terminal portions 50*c* of the first conductor connection body 60A are arranged apart from each other by the number of slots per pole (six slots) in the circumferential direction.

In the second conductor connection body 60B, the two terminal portions 50*c* (the input-side terminal portion 63 and the neutral-point-side terminal portion 64) extend from the slots 29 separated by the number of slots per pole−1 (five slots) in the circumferential direction. Out of the two terminal portions 50*c* of the second conductor connection body 60B, the input-side terminal portion 63 located on the other side θ2 in the circumferential direction extends longer by one slot to the one side θ1 in the circumferential direction as compared with the neutral-point-side terminal portion 64 located on the one side θ1 in the circumferential direction. For this reason, the two terminal portions 50*c* of the second conductor connection body 60B are arranged apart from each other by the number of slots per pole (six slots) in the circumferential direction.

In this manner, the input-side terminal portions 63 of the conductor connection bodies 60 of the same phase and the neutral-point-side terminal portion 64 of the conductor connection bodies 60 of the same phase are arranged apart from each other by the number of slots per pole in the circumferential direction. For this reason, the input-side terminal portions 63 and the neutral-point-side terminal portions 64 of the plurality of conductor connection bodies 60 (the first conductor connection body 60A and the second conductor connection body 60B) can be arranged to overlap each other.

The input-side terminal portions 63 of the conductor connection bodies 60 of the same phase (the first conductor connection body 60A and the second conductor connection body 60B) are arranged side by side in the radial direction and are connected to each other. The input-side terminal portions 63 of the conductor connection bodies 60 of the same phase are both connected to the phase bus bar (the U-phase bus bar 9U, the V-phase bus bar 9V, or the W-phase bus bar 9W).

Similarly, the neutral-point-side terminal portions 64 of the conductor connection bodies 60 of the same phase (the first conductor connection body 60A and the second conductor connection body 60B) are arranged side by side in the radial direction and are connected to each other. Further, the neutral-point-side terminal portions 64 of the conductor connection bodies 60 of the same phase are both connected to the neutral-point bus bar 8.

According to the present preferred embodiment, the input-side terminal portions 63 of two or more conductor connection body 60 of one phase coil portion 30A are electrically connected to each other. Similarly, the neutral-point-side terminal portions 64 of two or more conductor connection body 60 of one phase coil portion 30A are electrically connected to each other. As a result, the plurality of conductor connection bodies 60 of one phase coil portion 30A are connected in parallel to each other.

As illustrated in FIG. 5, a radial position of at least one of the neutral-point bus bar 8 and the phase bus bars 9U, 9V, and 9W is located between radial positions of the folded portions 50*f* and 50*g* and radial positions of the input-side terminal portion 63 and the neutral-point-side terminal portion 64. That is, when viewed from the axial direction, at least one of the neutral-point bus bar 8 and the phase bus bars 9U, 9V, and 9W is arranged between an inner edge and an outer edge of a coil end of the stator coil 30. For this reason, at least one of the neutral-point bus bar 8 and the phase bus bars 9U, 9V, and 9W can be suppressed from protruding to both sides in the radial direction from the stator coil 30.

Figure 17:
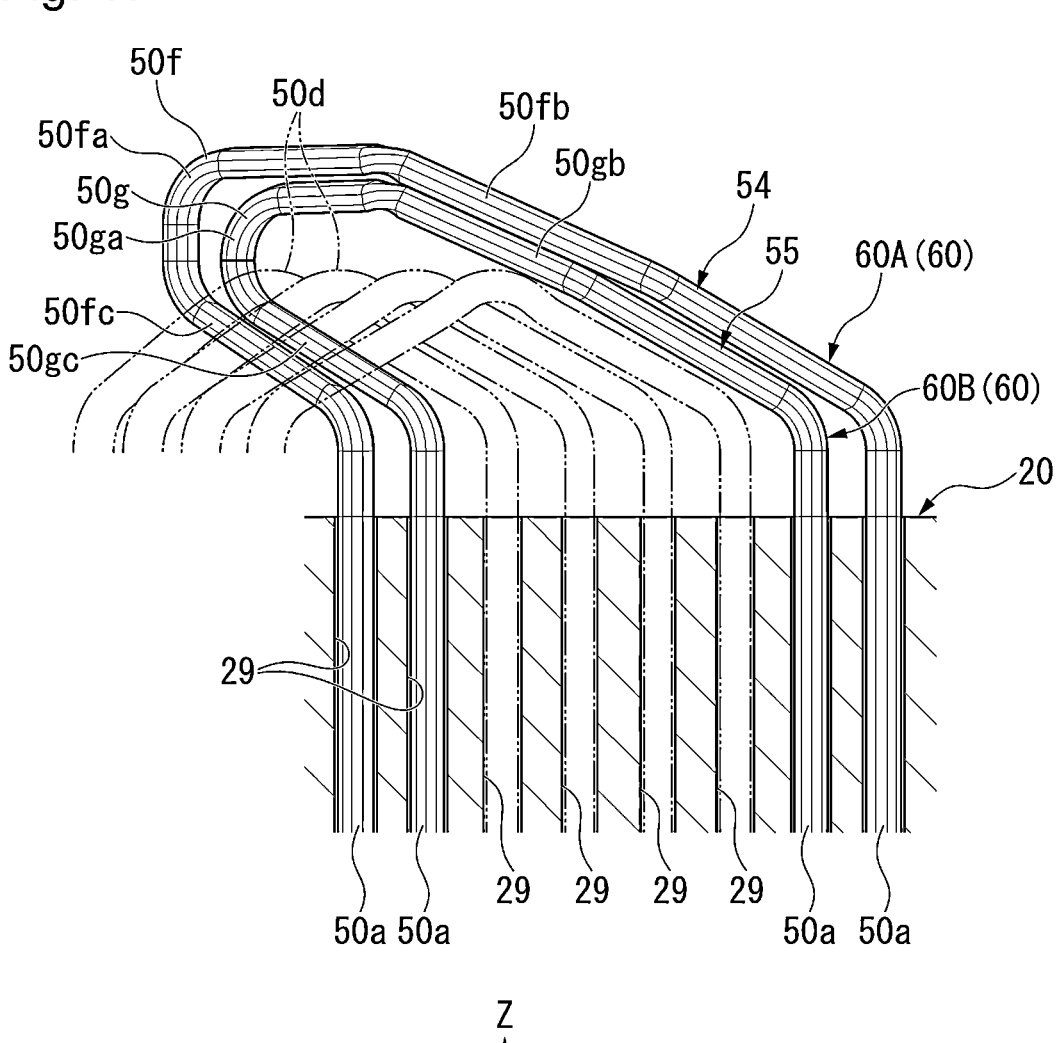
FIG. 17 is a schematic view illustrating a first folded portion and a second folded portion according to the preferred embodiment.

FIG. 17 is a schematic view illustrating the first folded portion 50*f* and the second folded portion 50*g*. As described above, in the first conductor connection body 60A, the wave-wound direction is folded from the one side θ1 in the circumferential direction to the other side θ2 in the circumferential direction at the first folded portion 50*f*. On the other hand, in the second conductor connection body 60B, the wave-wound direction is folded from the one side θ1 in the circumferential direction to the other side θ2 in the circumferential direction at the second folded portion 50*g*.

The two slots 29 from which the first folded portion 50*f* extends are separated by seven slots (that is, the number of slots per pole+1). On the other hand, the two slots 29 from which the second folded portion 50*g* extends are separated by five slots (that is, the number of slots per pole is −1).

The two slots 29 from which the first folded portion 50*f* extends are arranged on the circumferentially outer side of the two slots 29 from which the second folded portion 50*g* extends. Further, the first folded portion 50*f* passes above the second folded portion 50*g*. The first folded portion 50*f* is arranged so as to straddle the second folded portion 50*g* from the upper side and the both sides in the circumferential direction. Further, four slots 29 are arranged between the two slots 29 from which the second folded portion 50*g* extends. From these four slots 29, the curved portions 50*d* of other phases extend.

The bent portion 50*fa* of the first folded portion 50*f* and the bent portion 50*ga* of the second folded portion 50*g* are arranged to overlap each other in the circumferential direction. One extending portion 50*fb* of the first folded portion 50*f* and one extending portion 50*gb* of the second folded portion 50*g* extend in parallel with each other. Similarly, the other extending portion 50*fc* of the first folded portion 50*f* and the other extending portion 50*gc* of the second folded portion 50*g* extend in parallel with each other. That is, the folded portions (the first folded portion 50*f* and the second folded portion 50*g*) of the conductor connection bodies 60 of the same phase extend in parallel to each other before and after the bent portions 50*fa* and 50*ga*. For this reason, the folded portions (the first folded portion 50*f* and the second folded portion 50g) of the conductor connection bodies 60 of the same phase can be compactly stacked, so that the stator coil 30 can be downsized.

According to the present preferred embodiment, the extending portions 50fb, 50fc, 50gb, and 50gc of the first folded portion 50f and the second folded portion 50g extend in parallel with the curved portions 50d of the other phases. For this reason, the first folded portion 50f and the second folded portion 50g can be compactly laminated together with the curved portions 50d of the other phases, so that the stator coil 30 can be downsized.

Further, the first folded portion 50f and the second folded portion 50g are arranged to overlap each other in the axial direction. The first folded portion 50f and the second folded portion 50g protrude to the upper side (one side in the axial direction) with respect to the curved portions 50d of another phase. Furthermore, the first folded portion 50f and the second folded portion 50g overlap the curved portions 50d of the other phases on the upper side (one side in the axial direction) at the bent portions 50fa and 50ga, respectively. The folded portions (the first folded portion 50f and the second folded portion 50g) of the conductor connection bodies 60 of the same phase are arranged to overlap each other in the axial direction, protrude to the one side in the axial direction with respect to the curved portions 50d of the other phases, and overlap the curved portions 50d of the other phases on the one side in the axial direction. For this reason, the folded portions (the first folded portion 50f and the second folded portion 50g) can be suppressed from protruding radially inward or radially outward with respect to the curved portions 50d of the other phases. According to the present preferred embodiment, a radial dimension of the stator coil 30 can be reduced.

Figure 18:
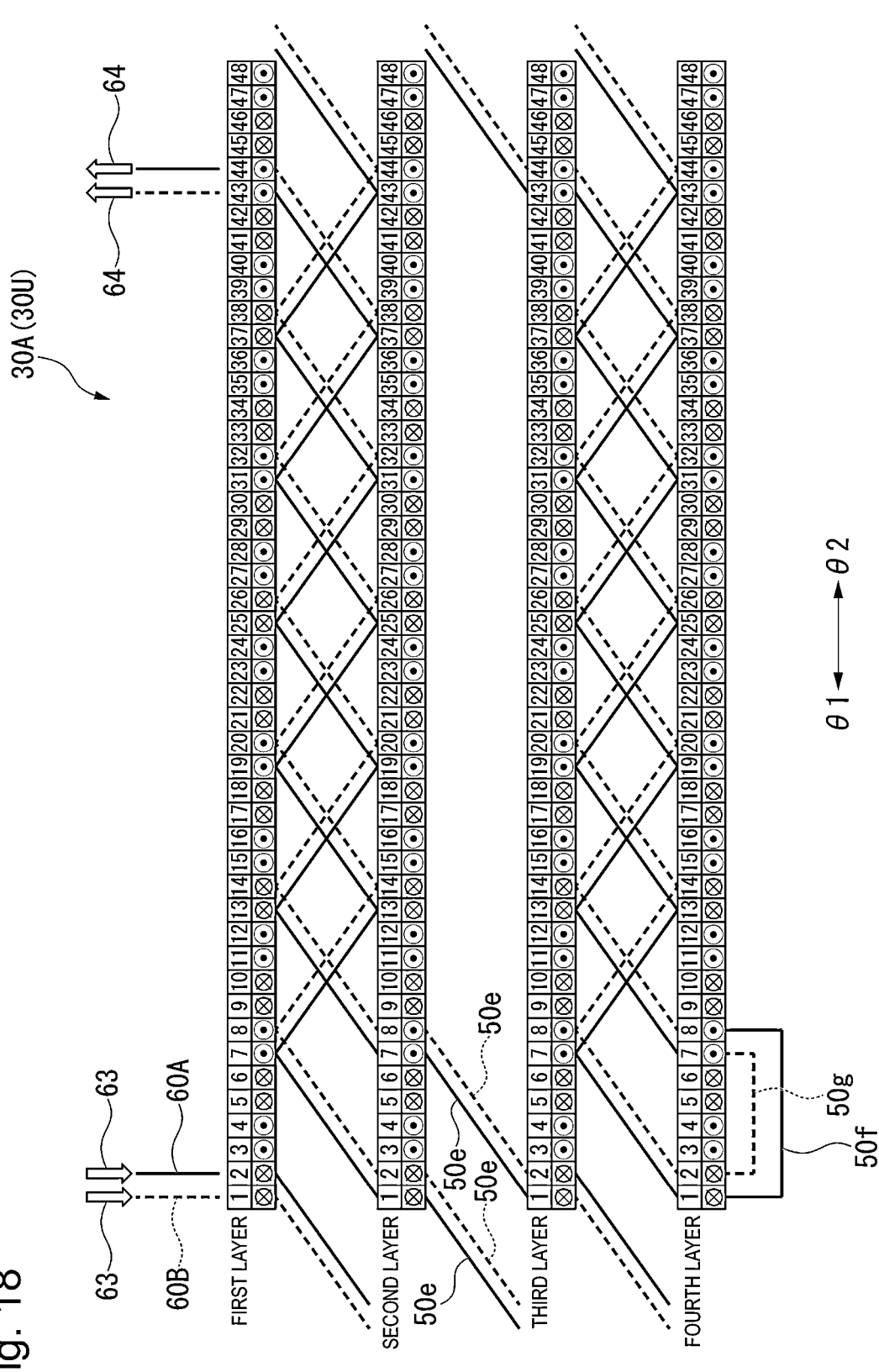
FIG. 18 is a schematic view illustrating layers in a slot through which a conductor connection body of the phase coil portion passes.

FIG. 18 is a schematic view illustrating a layer in the slot 29 through which the conductor connection body 60 (the first conductor connection body 60A and the second conductor connection body 60B) of one phase coil portion 30A passes.

In FIG. 18, the slot 29 from which the input-side terminal portion 63 of the second conductor connection body 60B extends is defined as the first slot, and slots are numbered up to the 48th slot toward the other side θ2 in the circumferential direction. In this case, the neutral-point-side terminal portion 64 of the second conductor connection body 60B extends from the 44th slot. Further, in the first conductor connection body 60A, the input-side terminal portion 63 extends from the second slot, and the neutral-point-side terminal portion 64 extends from the 43rd slot.

As illustrated in FIG. 18, the plurality of conductor connection bodies 60 of the same phase are arranged in the same slots 29 according to the present preferred embodiment, and thus, it is easy to secure insulation. Further, the two terminal portions 50c can be arranged close to the one side in the radial direction since the conductor connection body 60 has the folded portions 50f and 50g according to the present preferred embodiment. That is, the input-side terminal portions 63 and the neutral-point-side terminal portions 64 extend from the outermost layer (the first layer 29a) in all the phase coil portions 30A according to the present preferred embodiment. Therefore, all processes of connecting the bus bars 9U, 9V, 9W, and 8 to the input-side terminal portions 63 and the neutral-point-side terminal portions 64 can be performed from the radially outer side. As a result, a process of manufacturing the stator 10 and the motor 1 can be simplified.

Note that the phase coil portions 30A of the other phases are configured to be sequentially shifted by four slots from the phase coil portion 30A illustrated in FIG. 18. For example, the phase coil portion 30A illustrated in FIG. 18 is assumed to be the U-phase coil portion 30U. For the V-phase coil portion 30V, two input-side terminal portions 63 extend from the fifth and sixth slots 29, and two neutral-point-side terminal portions 64 extend from the 47th and 48th slots. Furthermore, for the W-phase coil portion 30W, two input-side terminal portions 63 extend from the ninth and tenth slots 29, and two neutral-point-side terminal portions 64 extend from the third and fourth slots.

Although various preferred embodiments of the present invention have been described above, configurations in the respective preferred embodiments and combinations thereof are examples, and thus, addition, omission, replacement of configurations, and other modifications can be made within a range without departing from the spirit of the present invention. Further, the present invention is not limited by the embodiments.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator comprising:

a stator core that has an annular shape centered on a central axis and is provided with a plurality of slots arranged in a circumferential direction; and phase coil portions mounted on the stator core, wherein each of the phase coil portions is configured to carry a corresponding phase of a plurality of phases, wherein each of the phase coil portions includes conductor connection bodies configured by connecting a plurality of conductors in series, each of the conductor connection bodies includes a plurality of straight portions passing through a corresponding slot of the plurality of slots, a plurality of curved portions extending across the straight portions on one side in an axial direction of the stator core, and a plurality of connection portions connecting the conductors to each other on another side in the axial direction of the stator core, each of the plurality of slots is provided with an even number of layers arranged in a radial direction, each of the conductor connection bodies is wound by causing a straight portion of the plurality of straight portions arranged in the circumferential direction to alternately pass through an M-th layer of a slot of the plurality of slots and an (M+1)-th layer of the slot of the plurality of slots multiple times with M being an odd natural number, wherein the straight portion has a uniform electrical resistance along an entirety of the straight portion, each of the conductor connection bodies includes a first terminal portion, a first part that is wave-wound from the first terminal portion to one side in the circumferential direction, a folded portion connected to an end of the first part on the one side in the circumferential direction, a second part that is wave-wound from the folded portion to another side in the circumferential direction, and a second terminal portion connected to an end of the second part on the another side in the circumferential direction, the first parts of the conductor connection bodies of a same phase are sequentially arranged in the slots arranged one by one on the one side in the circumferential direction, the second parts of conductor connection bodies of the same phase are sequentially arranged in the slots arranged one by one on the another side in the circumferential direction, the first terminal portion and the second terminal portion extend from an outermost layer of each of the plurality of slots, the first terminal portions of the conductor connection bodies of a same phase coil portion of the phase coil portions are electrically connected to each other, and the second terminal portions of the conductor connection bodies of the same phase coil portion the phase coil portions are electrically connected to each other, wherein the conductor connection bodies include a first conductor connection body and a second conductor connection body, the first conductor connection body includes:

a first folded conductor, wherein the first folded conductor includes two straight portions arranged in the circumferential direction, and a first folded portion connecting the two straight portions, the second conductor connection body includes:

a second folded conductor, wherein the second folded conductor includes two straight portions arranged in the circumferential direction, and a second folded portion connecting the two straight portions, a first slot of the plurality of slots is passed through by a first straight portion connected to a first end of the first folded portion and a second slot passed through by a second straight portion connected to a second end of the first folded portion are separated by seven slots of the plurality of slots, a third slot passed through by a third straight portion connected to a first end of the second folded portion and a fourth slot slot passed through by a fourth straight portion connected to a second end of the second folded portion are separated by five slots of the plurality of slots, a circumferential width of the first folded conductor and is different from a circumferential width of the second folded conductor, in the circumferential direction, the first slot is adjacent to the slot passed through by the straight portion connecting to the first terminal portion, and in the circumferential direction, the second slot and the slot passed through by the straight portion connected to the second terminal portion are separated by two or more slots.

2. The stator according to claim 1, wherein each of the plurality of slots is provided with four or more layers arranged in the radial direction, and the conductor connection body is wound by two or more turns to the one side in the circumferential direction in the first part, and is wound by a same number of turns as the first part to the another side in the circumferential direction in the second part.

3. The stator according to claim 2, wherein the first part and the second part have an interlayer curved portion extending to straddle the (M+1)-th layer and an (M+2)-th layer at a boundary where turns change.

4. The stator according to claim 1, wherein in the first part and the second part of the conductor connection body, the plurality of straight portions are arranged in the circumferential direction with a number of slots per pole.

5. The stator according to claim 1, wherein the folded portion includes a bent portion bent from the one side in the circumferential direction to the other side in the circumferential direction, and the folded portions of the conductor connection bodies of the same phase are arranged to overlap each other in the axial direction, protrude to the one side in the axial direction with respect to the curved portion of another phase, and overlap the curved portion of the other phase on the one side in the axial direction.

6. The stator according to claim 5, wherein the folded portions of the conductor connection bodies of the same phase extend in parallel to each other before and after the bent portion.

7. The stator according to claim 1, wherein the first terminal portions of the conductor connection bodies of the same phase and the second terminal portions of the conductor connection bodies of the same phase are arranged apart from each other by a number of slots per pole in the circumferential direction.

8. The stator according to claim 1, wherein the first terminal portions of the conductor connection bodies of the same phase are all connected to a phase bus bar, and the second terminal portions of the conductor connection bodies of the same phase are all connected to a neutral-point bus bar.

9. The stator according to claim 8, wherein the first terminal portions of the conductor connection bodies of the same phase are arranged side by side in the radial direction, and the second terminal portions of the conductor connection bodies of the same phase are arranged side by side in the radial direction.

10. The stator according to claim 8, wherein a radial position of at least one of the neutral-point bus bar and the phase bus bar is located between a radial position of the folded portion and radial positions of the first terminal portion and the second terminal portion.

11. A motor comprising:

the stator according to claim 1; and a rotor radially opposing the stator.

12. A stator comprising:

a stator core that has an annular shape centered on a central axis and is provided with a plurality of slots arranged in a circumferential direction; and phase coil portions mounted on the stator core, wherein each of the phase coil portions is configured to carry a corresponding phase of a plurality of phases, wherein each of the phase coil portions includes conductor connection bodies configured by connecting a plurality of conductors in series, each of the conductor connection bodies includes a plurality of straight portions passing through a corresponding slot of the plurality of slots, a plurality of curved portions extending across the straight portions on one side in an axial direction of the stator core, and a plurality of connection portions connecting the conductors to each other on another side in the axial direction of the stator core, each of the plurality of slots is provided with an even number of layers arranged in a radial direction, each of the conductor connection bodies is wound by causing a straight portion of the plurality of straight portions arranged in the circumferential direction to alternately pass through an M-th layer of a slot of the plurality of slots and an (M+1)-th layer of the slot of the plurality of slots multiple times with M being an odd natural number, each of the conductor connection bodies includes a first terminal portion, a first part that is wave-wound from the first terminal portion to one side in the circumferential direction, a folded portion connected to an end of the first part on the one side in the circumferential direction, a second part that is wave-wound from the folded portion to another side in the circumferential direction, and a second terminal portion connected to an end of the second part on the another side in the circumferential direction, the first parts of the conductor connection bodies of a same phase are sequentially arranged in the slots arranged one by one on the one side in the circumferential direction, the second parts of conductor connection bodies of the same phase are sequentially arranged in the slots arranged one by one on the another side in the circumferential direction, the first terminal portion and the second terminal portion extend from an outermost layer of each of the plurality of slots, the first terminal portions of the conductor connection bodies of a same phase coil portion of the phase coil portions are electrically connected to each other, and the second terminal portions of the conductor connection bodies of the same phase coil portion the phase coil portions are electrically connected to each other, wherein each of the plurality of slots is provided with four or more layers arranged in the radial direction, and the conductor connection body is wound by two or more turns to the one side in the circumferential direction in the first part, and is wound by a same number of turns as the first part to the another side in the circumferential direction in the second part, wherein the first part and the second part have an interlayer curved portion extending to straddle the (M+1)-th layer and an (M+2)-th layer at a boundary where turns change, wherein at least one of the first terminal portions or the second terminal portions, a curved portion of the plurality of curved portions, the folded, and the interlayer curved portion has a different shape from one another, wherein the conductor connection bodies include a first conductor connection body and a second conductor connection body, the first conductor connection body includes:

a first folded conductor, wherein the first folded conductor includes two straight portions arranged in the circumferential direction, and a first folded portion connecting the two straight portions, the second conductor connection body includes:

a second folded conductor, wherein the second folded conductor includes two straight portions arranged in the circumferential direction, and a second folded portion connecting the two straight portions, a first slot of the plurality of slots is passed through by a first straight portion connected to a first end of the first folded portion and a second slot passed through by a second straight portion connected to a second end of the first folded portion are separated by seven slots of the plurality of slots, a third slot passed through by a third straight portion connected to a first end of the second folded portion and a fourth slot passed through by a fourth straight portion connected to a second end of the second folded portion are separated by five slots of the plurality of slots, a circumferential width of the first folded conductor and is different from a circumferential width of the second folded conductor, in the circumferential direction, the first slot is adjacent to the slot passed through by the straight portion connecting to the first terminal portion, and in the circumferential direction, the second slot and the slot passed through by the straight portion connected to the second terminal portion are separated by two or more slots.

13. The stator according to claim 12, wherein in the first part and the second part of the conductor connection body, the plurality of straight portions are arranged in the circumferential direction with a number of slots per pole.

14. The stator according to claim 12, wherein the folded portion includes a bent portion bent from the one side in the circumferential direction to the other side in the circumferential direction, and the folded portions of the conductor connection bodies of the same phase are arranged to overlap each other in the axial direction, protrude to the one side in the axial direction with respect to the curved portion of another phase, and overlap the curved portion of the other phase on the one side in the axial direction.

15. The stator according to claim 14, wherein the folded portions of the conductor connection bodies of the same phase extend in parallel to each other before and after the bent portion.

16. The stator according to claim 12, wherein the first terminal portions of the conductor connection bodies of the same phase and the second terminal portions of the conductor connection bodies of the same phase are arranged apart from each other by a number of slots per pole in the circumferential direction.

17. The stator according to claim 12, wherein the first terminal portions of the conductor connection bodies of the same phase are all connected to a phase bus bar, and the second terminal portions of the conductor connection bodies of the same phase are all connected to a neutral-point bus bar.

18. The stator according to claim 17, wherein the first terminal portions of the conductor connection bodies of the same phase are arranged side by side in the radial direction, and the second terminal portions of the conductor connection bodies of the same phase are arranged side by side in the radial direction.

19. A motor comprising:

the stator according to claim 12; and a rotor radially opposing the stator.

20. The stator according to claim 12, wherein the interlayer curved portion comprises:

a first diagonal member extending in a first direction;

a second diagonal member extending in a second direction different from the first direction, and a straight portion connecting the first diagonal member to the second diagonal member, wherein the straight portion extends in a third direction different from each of the first direction and the second direction.

* * * * *